United States Patent
Murakami et al.

(10) Patent No.: US 6,542,853 B1
(45) Date of Patent: Apr. 1, 2003

(54) LIFE ESTIMATION DEVICE FOR ENGINE AND MACHINE HAVING HEAT SOURCE

(75) Inventors: Taku Murakami, Yamato (JP); Ichio Ichikawa, Sagamihara (JP); Haruo Hashimoto, Kamakura (JP); Koji Iijima, Hiratsuka (JP); Fumihide Sato, Oyama (JP); Hiroshi Ohkawa, Oyama (JP)

(73) Assignee: Komatsu, Ltd., Tokyo (JP)

( * ) Notice: Subject to any disclaimer, the term of this patent is extended or adjusted under 35 U.S.C. 154(b) by 0 days.

(21) Appl. No.: 09/554,450

(22) PCT Filed: Nov. 16, 1998

(86) PCT No.: PCT/JP98/05158
§ 371 (c)(1),
(2), (4) Date: May 15, 2000

(87) PCT Pub. No.: WO99/26050
PCT Pub. Date: May 27, 1999

(30) Foreign Application Priority Data

| Nov. 17, 1997 | (JP) | 9-315590 |
| Nov. 18, 1997 | (JP) | 9-317256 |
| Feb. 16, 1998 | (JP) | 10-032952 |

(51) Int. Cl.$^7$ ............................................ G06F 15/00
(52) U.S. Cl. ............... 702/183; 702/183; 702/33; 702/113; 700/39; 700/46; 700/93; 123/179.15; 123/339.15; 374/55; 374/101; 374/127
(58) Field of Search ............... 702/33–36, 42, 702/44, 75–79, 113–115, 130, 132, 136, 141, 142, 145–148, 177–178, 182–185, 188; 73/1.08, 1.09, 1.14, 1.68, 1.84, 1.87, 64.49, 119; 374/40–41, 45–49, 55–56, 101–104, 119; 700/39–42, 46, 67, 78, 93, 103, 252, 256; 701/15, 30, 33, 35, 102, 115; 123/41.05, 179.15, 339.15–339.24

(56) References Cited

U.S. PATENT DOCUMENTS 3,593,012 A * 7/1971 Lang ........................... 235/193
5,337,240 A * 8/1994 Nakagawa et al. ......... 235/193

FOREIGN PATENT DOCUMENTS

| JP | 59-3335 | 1/1984 |
| JP | 4180087 | 6/1992 |
| JP | 5245323 | 9/1993 |
| JP | 6-10748 | 1/1994 |
| JP | 7-51988 | 2/1995 |
| JP | 9119339 | 5/1997 |

* cited by examiner

Primary Examiner—Marc S. Hoff
Assistant Examiner—Elias Desta
(74) Attorney, Agent, or Firm—Varndell & Varndell, PLLC

(57) ABSTRACT

A life estimation device which numerically measures the damage to a machine such as an engine accurately to estimate, the life of the machine accurately without requiring skill. A load map (B) of the two-dimensional distribution of the operation parameters of an engine is made. In accordance with the weighted integration time $\alpha i \cdot ki$ at each level (Bi) of the load map (B), the actual damage $\delta = \Sigma \alpha i \cdot ki$ to the engine for a certain lapse of time $\tau$ is calculated. By operating the engine beforehand, a correspondence relation L2 between the magnitude of the damage $\delta$ and the life H is predetermined. The life H1 corresponding to the calculated actual damage $\delta 1$ is determined in accordance with the predetermined correspondence relation L2 and the H1 is outputted as the estimated life of the engine.

35 Claims, 21 Drawing Sheets

**DIAGRAM DEPICTING RELATIONSHIP BETWEEN
LOAD MAP AND DETECTION FREQUENCY**

**DIAGRAM DEPICTING RELATIONSHIP BETWEEN
LOAD MAP AND DETECTION FREQUENCY CONVERTED TO %**

DIAGRAM DEPICTING RELATIONSHIP BETWEEN
LOAD MAP AND WEIGHT

DIAGRAM DEPICTING RELATIONSHIP BETWEEN
AVERAGE LOAD FACTOR AND LIFE

LIFE ESTIMATION DEVICE FOR ENGINE AND MACHINE HAVING HEAT SOURCE

TECHNICAL FIELD

The present invention relates to a life estimation device for an engine which collects data on operation parameters, such as engine rotational speed, which values change when an engine of a construction machine or other machine is operating, and estimates the life of the engine based on the data on the operation parameters. The present invention also relates to a life estimation device for an engine which collects data on the operation parameters, such as engine rotational speed, which values change when a machine having a heat source, such as an engine, is operating, and estimates the life of the engine of the machine based on the data on the operation parameters.

BACKGROUND ART

It is extremely important to accurately estimate the time of overhaul for inspections and maintenance services of construction machines.

Because if the time of overhaul is accurately estimated, serious accidents, such as major damage to the engine, can be prevented by executing maintenance at an appropriate time. Also, estimating the time of overhaul accurately makes maintenance planning possible. In other words, the advantages are that accurate production planning, including vehicle schedule planniing, is possible, preparing parts required for overhaul at the required time is possible, and management of mechanics is easier.

In construction machines, however, the operating conditions of the engine greatly differ depending on the operating environment and operation of the individual user, and the time required for overhaul greatly differs even if the same model and same type engine is used. A simple determination of the overhaul time of an engine is not possible.

Therefore, it is required to accurately estimate the time of overhaul, that is, the life of the engine for an individual construction machine and individual engine.

The life of an engine is determined by the actual damage quantity exerted on the engine; that is, the accumulated load applied to the engine.

However, a numeric representation of the damage quantity exerted on the engine is actually difficult, so an indirect numeric representation of the damage quantity exerted on the engine based on the operating status of the engine at respective occasions has been attempted.

In other words, conventionally, the operating status of the engine is periodically recorded by a service tool, and the time of overhaul is determined by comparing the recorded value with the preset threshold value. For example, the valve clearance is actually measured, and this measured value is compared with the threshold value as instructed in the shop manual, and the time of overhaul is judged when the measured value exceeds the threshold value. The sound of the engine is also listened to, and the time of overhaul is judged by whether an abnormal sound is heard.

However, such operating states of the engine at each occasion do not accurately indicate the damage quantity exerted on the engine, and judgment on whether it is the time of overhaul greatly depends on the skill and experience of the mechanic. Therefore, the estimation of the time of overhaul is not always accurate.

Another attempt is to collect not only the operating states of the engine on respective occasions, but also to collect data on the engine (e.g. horse power of the engine) over a long period of time, determining the time of overhaul from the time-based changes.

However, it is difficult to represent the damage quantity actually exerted on the engine by numerics to determine the life of the engine. In other words, if the engine is continuously operated with a predetermined load (e.g. engine is always operated at a rated point), the damage quantity can be estimated relatively easily, assuming that the damage quantity increases in proportion to time, but if the load of the engine fluctuates as time elapses, numeric representation of the damage quantity is difficult. As a result, the time of overhaul has been determined based on the skill and experience of the mechanic.

In this way, a conventional method for estimating the time of overhaul, where judgment is not based on numeric representation of damage actually exerted on the damage, but depends on the skill of the mechanic, was not very accurate.

Because of this, it was always possible that an appropriate overhaul could not be taken at the necessary time, and a serious accident, such as major damage to the engine, occurred.

With the foregoing in view, it is the first object of the present invention to accurately represent the damage quantity exerted on the engine by numerics, so that the life of the engine can be automatically and accurately estimated without expert skills.

The life of the engine is determined not only by the above mentioned accumulation of load but also by the time the engine is exposed to heat.

In this case, there are two types of damage exerted on the engine, one is the drop in strength which occurs when the engine is exposed to high temperature. This is called "heat temperature fatigue". The other damage is heat deterioration which is caused by repeated rise and fall of the temperature. This is called "thermal fatigue".

Numeric representation of such damage quantity exerted on the engine due to heat was as difficult as the above mentioned numeric representation of damage quantity exerted on the engine due to the accumulation of load.

With the foregoing in view, it is the second object of the present invention to accurately represent the damage quantity exerted on a machine having such a heat source as an engine (e.g. power train which is influenced by the heat of the engine itself, or heat generated by the engine) by numerics, so that the life of the machine having a heat source can be automatically and accurately estimated without expert skills.

DISCLOSURE OF THE INVENTION

The first aspect to the sixteenth aspect of the present invention are to achieve the first object.

The first aspect of the present invention is a life estimation device for an engine which collects data of operation parameters which values change when the engine is operating and estimates a life of the engine based on the data of the operation parameters, comprising:

load map setting means (4) for selecting one operation parameter or two or more operation parameters indicative of a load exerted on the engine, and dividing a value of the one operation parameter or combinations of values of the two or more operation parameters into a plurality of levels, so as to set a one-dimensional or two- or more dimensional load map for indicating a distribution of magnitude of the load exerted on the engine;

operation parameter detection means (2, 3) for detecting the values of the operation parameters;

time integration means (7, 8), by detecting the operation parameters by the operation parameter detection means until a predetermined time elapses, for integrating a time during which operation parameter values belonging to the respective level are detected for each level of the load map;

weight setting means (5) for setting a weight in accordance with the load of the respective level for each level of the load map;

damage quantity calculation means (9) for determining the weighted integration time for each level of the load map by weighting the integration time integrated by the time integration means in accordance with the weight set by the weight setting means, and calculating an actual damage quantity exerted on the engine until the predetermined time elapses based on the integration time weighted for each level of the load map;

correspondence relationship setting means (6) for presetting a correspondence relations hip between a magnitude of the damage quantity and a length of life by pre-operating the engine; and life estimation means (10) for determining a life corresponding to the actual damage quantity calculated by the damage quantity calculation means from the correspondence relationship preset by the correspondence relationship setting means, and outputting the determined life as the estimated life of the engine.

According to the configuration of the first aspect of the present invention, the engine rotational speed Ne and the rack position of the governor (fuel consumption) V are selected as the operation parameters indicative of the load exerted on the engine, as shown in FIG. 3, and the combinations of the operation parameter values Ne and V are divided into a plurality of levels B1, B2, ... B16. In this way, the two-dimensional load map B which indicates the distribution of the load exerted on the engine is set.

And these operation parameter values Ne and V are detected.

As FIG. 4 shows, these operation parameters Ne and V are detected until the predetermined time τ elapses, and time αi when the values of the operation parameters belonging to the respective level Bi (i=1–16) are detected is integrated for each level B1, B2, ... B16 of the load map B.

Also, as FIG. 5 shows, a weight ki in accordance with the load at the respective level Bi is set for each level B1, B2, ... B16 of the load map B.

And by executing weighting αi·ki, in accordance with the above mentioned preset weight ki for the above mentioned integrated integration time αi, the weighted integration time αi·ki is determined for each level B1, B2, ... B16 of the load map B, and actual damage quantity σ=Σαi·ki exerted on the engine until the predetermined time τ elapses is calculated based on the weighted integration time αi·ki for each level Bi of the load map B.

As FIG. 6 shows, the correspondence relationship L2 between the magnitude of damage quantity a and length of life H is preset by pre-operating the engine.

Therefore, the life H1 corresponding to the above calculated actual damage quantity σ1 is determined from the above mentioned preset correspondence relationship L2, and the determined life H1 is output as the estimated life of the engine.

In this way, the damage quantity σ1 exerted on the engine is accurately represented by numerics and the life H1 of the engine can be automatically and accurately estimated without expert skills.

The second aspect of the present invention is the first aspect of the present invention, characterized in that the two operation parameters indicative of the load exerted on the engine are an engine rotational speed Ne and a torque or a horse power of the engine. And the two-dimensional load map of the engine rotational speed Ne and the torque or the horse power of the engine is set.

The third aspect of the present invention is the first aspect of the present invention, characterized in that the values of the operation parameters Ne and V are detected at each predetermined interval Δt, as shown in FIG. 7. By counting the number of times ni when the operation parameter values Ne and V belonging to the respective level Bi for each level B1, B2, ... B16 of the load map B until the predetermined time τ elapses (total number of times of detection: N), the time when the operation parameter values Ne and V belonging to the level Bi are detected, that is, αi=(ni/N)·100, is integrated for each level B1, B2, ... B16 of the load map B, as shown in FIG. 3.

The fourth aspect of the present invention is the first aspect of the present invention, characterized in that the integration time αi is reset each time the predetermined time τ elapses, so as to re-estimate the life of the engine each time the predetermined time τ elapses.

Abrasion of the moving parts of the engine is promoted more as the change of engine load and change of engine rotational speed increases. Therefore, the damage quantity actually exerted on the engine differs depending on the fluctuation quantity of the engine load and the fluctuation quantity of the engine rotational speed.

The fifth aspect to the tenth aspect of the present invention are based on the view where the difference in the fluctuation quantity of the engine load and the fluctuation quantity of the engine rotational speed greatly influence the life of the engine in general and of the parts constituting the engine.

So, the fifth aspect of the present invention is a life estimation device for an engine which collects data of operation parameters which values change when the engine is operating, and estimates a life of the engine based on the data of the operation parameters, comprising:

operation parameter detection means (2, 3) for selecting one operation parameter or two or more operation parameters indicative of a load exerted on the engine or an engine rotational speed and detecting values of the selected operation parameters at each predetermined interval;

fluctuation quantity calculation means (28) for calculating a fluctuation quantity of the operation parameters per unit time based on the values of the operation parameters detected by the operation parameter detection means at each predetermined interval;

fluctuation quantity map setting means (25) for setting a fluctuation quantity map indicative of a distribution of magnitude of the fluctuation quantity of the operation parameters per the unit time;

frequency measurement means (29, 30) for measuring a frequency of calculating the respective magnitude of the fluctuation quantity until a predetermined time elapses for each magnitude of the fluctuation quantity of the fluctuation quantity map;

weight setting means (26) for setting a weight for each magnitude of the fluctuation quantity of the fluctuation quantity map;

damage quantity calculation means (34) for determining the weighted frequency for each magnitude of the fluctuation quantity of the fluctuation quantity map by weighting the frequency measured by the frequency measurement means in accordance with the weight set by the weight setting means, and calculating an actual damage quantity exerted on the engine until the predetermined time elapses based on the weighted frequency for each magnitude of the fluctuation quantity of the fluctuation quantity map;

correspondence relationship setting means (2) for presetting a correspondence relationship between the magnitude of the damage quantity and a length of life by pre-operating the engine; and life estimation means (31) for determining the life corresponding to the actual damage quantity calculated by the damage quantity calculation means from the correspondence relationship preset by the correspondence relationship setting means, and outputting the determined life as the estimated life of the engine.

According to the configuration of the fifth aspect of the present invention, the engine rotational speed Ne and the rack position of the governor (fuel consumption) V are selected as the operation parameters indicative of the load exerted on the engine and the engine rotational speed, and these operation parameter values Ne and V are detected at each predetermined interval $\Delta t$, as shown in FIG. 7.

And as FIG. 10 shows, the fluctuation quantity of the operation parameter Ne per unit time is calculated based on the values of the operation parameters which are detected sequentially.

And the fluctuation quantity map HS indicative of the distribution of the magnitude of the fluctuation quantity $\Delta Nej$ of the operation parameters per unit time is set.

Then, as FIG. 13 shows, the frequency $\alpha j$ to calculate the fluctuation quantity of the respective magnitude $\Delta Nej$ (j=1–4) is measured until the predetermined time $\tau$ elapses, for each magnitude of the fluctuation quantity $\Delta Nej$, that is, $\Delta Ne1$, $\Delta Ne2$, $\Delta Ne3$ and $\Delta Ne4$ of the fluctuation quantity map HS.

On the other hand, as FIG. 21 shows, weights k1, k2, k3 and k4 are set for each magnitude of the fluctuation quantity $\Delta Nej$, that is, $\Delta Ne1$, $\Delta Ne2$, $\Delta Ne3$ and $\Delta Ne4$ of the fluctuation quantity map HS.

And the above mentioned measured frequency $\alpha j$ is weighted in accordance with the above set weight kj, so that the weighted frequency $kj \cdot \alpha j$ is determined for each magnitude of the fluctuation quantity $\Delta Nej$ of the fluctuation quantity map HS, and the actual damage quantity $\gamma f = \Sigma kj \cdot \alpha j$ exerted on the engine until the predetermined time $\tau$ elapses is calculated based on the weighted frequency $kj \cdot \alpha j$ of each magnitude of the fluctuation quantity $\Delta Nej$ of the second map HS.

On the other hand, the correspondence relationship between the magnitude of the damage quantity $\gamma t = \Sigma kj \cdot \beta j$ and the length of life Lt is preset by pre-operating the engine.

Then the life Lf corresponding to the above calculated actual damage quantity $\gamma f$ is determined from the above mentioned preset correspondence relationship between $\gamma t$ and Lt (Lf=$(\gamma t/\gamma f) \cdot$Lt), and the determined life Lf is output as the estimated life of the engine.

The sixth aspect of the present invention is a life estimation device for an engine which collects data of operation parameters which values change when the engine is operating, and estimates a life of the engine based on the data of the operation parameters; comprising:

a first map setting means (24) for setting one operation parameter or two or more operation parameters indicative of a load exerted on the engine or an engine rotational speed and setting a one-dimensional or two- or more dimensional first map indicative of a distribution of magnitude of the load exerted on the engine or a magnitude of the rotational speed by dividing a value of the one operation parameter or combinations of values of two or more operation parameters into a plurality of levels;

operation parameter detection means (2, 3) for detecting the operation parameter values at each predetermined interval;

judgment means (27) where which level of the first map the operation parameter values, which are detected by the operation parameter detection means at each predetermined interval, belong to, is judged at the predetermined interval;

fluctuation quantity calculation means (28) where based on the level judged sequentially by the judgment means, the fluctuation width between the levels which fluctuated per unit time is calculated as the fluctuation quantity of the operation parameters per unit time;

a second map setting means (25) for setting a second map indicative of the distribution of magnitude of the fluctuation quantity of the operation parameters per the unit time;

frequency measurement means (29, 30) for measuring a frequency of calculating the respective magnitude of the fluctuation quantity until a predetermined time elapses for each magnitude of the fluctuation quantity of the second map;

weight setting means (26) for setting a weight for each magnitude of the fluctuation quantity of the second map;

damage quantity calculation means (34) for determining the weighted frequency for each magnitude of the fluctuation quantity of the second map by weighting the frequency measured by the frequency measurement means in accordance with the weight set by the weight setting means, and calculating an actual damage quantity exerted on the engine until the predetermined time elapses based on the weighted frequency for each magnitude of the fluctuation quantity of the second map;

corresponding relationship setting means (26) for presetting a correspondence relationship between the magnitude of the damage quantity and a length of life by pre-operating the engine; and life estimation means (31) for determining the life corresponding to the actual damage quantity calculated by the damage quantity calculation means from the correspondence relationship preset by the correspondence relationship setting means, and outputting the determined life as the estimated life of the engine.

According to the configuration of the sixth aspect of the present invention, the engine rotational speed Ne and the rack position of the governor (fuel consumption) V are selected as the operation parameters indicative of the load exerted on the engine and the engine rotational speed, and combinations of these operation parameter values Ne and V are divided into the plurality of levels B1, B2, . . . B16, as shown in FIG. 10. In this way, the two-dimensional first map B indicative of the distribution of the degree of load exerted on the engine and the degree of the engine rotational speed is set.

And as FIG. 7 shows, these operation parameter values Ne and V are detected at each predetermined interval $\Delta t$.

Then which level Bi (i=1–16) of the first map B the operation parameter values Ne and V detected at each predetermined interval Δt belong to is judged at each predetermined interval Δt.

And as FIG. 10 shows, based on the levels B7 and B8 judged sequentially, the fluctuation width ΔNe1 between both levels B7 and B8, which fluctuated per unit time, is calculated as the fluctuation quantity ΔNe of the operation parameter Ne per unit time.

Then as FIG. 11 shows, the second map HS indicative of the distribution of the magnitude of the fluctuation quantity ΔNej of the operation parameter per unit time is set.

And as FIG. 13 shows, the frequency Δj to calculate the fluctuation quantity of the respective magnitude ΔNej (j=1–4) is measured until the predetermined time τ elapses for each magnitude of the fluctuation quantity ΔNej, that is, ΔNe1, ΔNe2, ΔNe3 and ΔNe4, of the second map HS.

On the other hand, as FIG. 21 shows, weights K1, K2, K3 and K4 are set for each magnitude of the fluctuation quantity ΔNej, that is, ΔNe1, ΔNe2, ΔNe3 and ΔNe4, of the second map HS.

And the above mentioned measured frequency αj is weighted in accordance with the above set weight kj, so that the weighted frequency kj·αj is determined for each magnitude of the fluctuation quantity ΔNej of the second map HS, and the actual damage quantity γf=Σkj·αj exerted on the engine until the predetermined time τ elapses is calculated based on the weighted frequency kj·αj for each magnitude of the fluctuation quantity ΔNej of the second map HS.

On the other hand, the correspondence relationship between the magnitude of the damage quantity γt=Σkj·βj and the length of life Lt is preset by pre-operating the engine.

Then the life Lf corresponding to the above calculated actual damage quantity γf is determined from the above mentioned preset correspondence relationship between γt and Lt (Lf=(γt/γf)·Lt), and the determined life Lf is output as the estimated life of the engine.

The seventh aspect of the present invention is the fifth aspect of the present invention, characterized in that the selected operation parameters are the engine rotational speed Ne or the torque T or the horse power PS of the engine.

The eighth aspect of the present invention is the sixth aspect of the present invention, characterized in that the first map B is a two-dimensional map of the engine rotational speed Ne and the torque T or the horse power PS of the engine, and the second map HS is a one-dimensional map of the fluctuation quantity of the engine rotational speed Ne or a one-dimensional map of the fluctuation quantity of the engine torque T or engine horse power PS.

The ninth aspect of the present invention is the fifth aspect or the sixth aspect of the present invention, characterized in that a specified detection range (B15, B16) in accordance with the type of parts constituting the engine is excluded from the detection target range for the operation parameter values Ne and V which are detected at each predetermined interval Δt, as shown in FIG. 14, and the life is estimated for each type of parts constituting the engine.

Also the ninth aspect of the present invention is the sixth aspect of the present invention, characterized in that the specified levels B15 and B16 in accordance with the type of parts constituting the engine are excluded from the judgment targets on which level Bi (i=1–16) of the first map B the operation parameter values Ne and V detected at each predetermined interval Δt belong to, and the life is estimated for each type of parts constituting the engine.

The tenth aspect of the present invention is the fifth or sixth aspect of the present invention, characterized in that the value of the weight kj is changed in accordance with the type of parts constituting the engine and the life is estimated for each type of parts constituting the engine.

The eleventh aspect of the present invention is the fifth or sixth aspect of the present invention, characterized in that the frequency αj is reset each time the predetermined time τ elapses, so that the life of the engine is re-estimated each time the predetermined time τ elapses.

The twelfth aspect of the present invention is a life estimation device for an engine which collects data of operation parameters which values change when the engine is operating and estimates a life of the engine based on the data of the operation parameters, comprising:

a first map setting means (24) for selecting two or more operation parameters indicative of a load exerted on the engine and an engine rotational speed, and setting a first map of two- or more dimensions indicative of a distribution of magnitude of the load exerted on the engine and a magnitude of the rotational speed by dividing combinations of values of the two or more operation parameters into a plurality of levels;

operation parameter detection means (2, 3) for detecting the operation parameter values at each predetermined interval;

judgment means (27) where which level of the first map the operation parameter values, which are detected by the operation parameter detection means at each predetermined interval, belong to, is judged at the predetermined interval;

fluctuation locus calculation means (33), based on the level judged sequentially by the judgment means, for calculating a fluctuation locus between both levels which fluctuated per unit time;

second map setting means (25) for setting a second map indicative of the distribution of types of the fluctuation locus between both levels per the unit time;

frequency measurement means (29, 30) for measuring a frequency of calculating the respective type of the fluctuation locus until a predetermined time elapses for each type of fluctuation locus of the second map;

weight setting means (26) for setting a weight for each type of fluctuation locus of the second map;

damage quantity calculation means (34) for determining the weighted frequency for each type of fluctuation locus of the second map by weighting the frequency measured by the frequency measurement means in accordance with the weight set by the weight setting means, and calculating an actual damage quantity exerted on the engine until the predetermined time elapses based on the weighted frequency for each type of fluctuation locus of the second map;

correspondence relationship setting means (26) for presetting a correspondence relationship between the magnitude of the damage quantity and a length of the life by pre-operating the engine; and life estimation means (31) for determining the life corresponding to the actual damage quantity calculated by the damage quantity calculation means from the correspondence relationship preset by the correspondence relationship means, and outputting the determined life as the estimated life of the engine.

According to the configuration of the twelfth aspect of the present invention, the engine rotational speed Ne and the rank position of the governor (fuel consumption) V are selected as the operation parameters indicative of the load exerted on the engine and the engine rotational speed, as shown in FIG. 17, and the combinations of these operation parameter values Ne and V are divided into the plurality of levels B1, B2, B3 and B4. In this way, the two-dimensional first map B, indicative of the distribution of the magnitude of the load exerted on the engine and the magnitude of the engine rotational speed, is set.

And as FIG. 7 shows, these operation parameter values Ne and V are detected at each predetermined interval Δt.

Then, which level Bi (i=1–4) of the first map B the operation parameter values Ne and V, which are detected at each predetermined interval Δt, belong to, is judged at each predetermined interval Δt.

And as FIG. 17 shows, based on the levels B3 and B1 judged sequentially, the fluctuation locus between the levels B3→B1 (locus H) which fluctuated per unit time is calculated.

Then as FIG. 18 shows, the second map HS indicative of the distribution of the types of fluctuation locus Mj (M1 (B1→B2), M2 (B1→B3 . . . ) between the levels per unit time, is set.

And the frequency αj of calculating the fluctuation locus Mj (j=1–12) of the respective type is measured until a predetermined time τ elapses for each type of the fluctuation locus, that is, M1 (B1→B2), M2 (B1→B3)

On the other hand, as FIG. 21 shows, a weight kj is set for each type of fluctuation locus Mj of the second map HS.

And the above mentioned measured frequency αj is weighted in accordance with the above set weight kj, so that the weighted frequency kj·αj is determined for each type of the fluctuation locus Mj of the second map HS, and the actual damage quantity of γf=Σkj·αj exerted on the engine until the predetermined time τ elapses is calculated based on the weighted frequency kj·αj for each type of fluctuation locus Mj of the second map HS.

On the other hand, the correspondence relationship between the magnitude of the damage quantity γt=Σkj·βj and the length of the life Lt is preset by pre-operating the engine.

Then, the life Lf corresponding to the above calculated actual damage quantity γf is determined from the above mentioned preset correspondence relationship between γt and Lt (Lf=(γt/γf)·Lt), and the determined life Lf is output as the estimated life of the engine.

The thirteenth aspect, fourteenth aspect, fifteenth aspect and sixteenth aspect of the present invention correspond to the above mentioned eighth aspect, ninth aspect, tenth aspect and eleventh aspect of the present invention respectively.

The seventeenth aspect to the thirty fifth aspect of the present invention are aspects for achieving the second object.

In the seventeenth aspect to the twenty third aspect of the present invention, the life of the machine is estimated by determining the damage quantity caused by high temperature fatigue in the same manner as the above mentioned first aspect to fourth aspect of the present invention.

In the twenty fourth aspect to the thirty fifth aspect of the present invention, the life of the machine is estimated by determining the damage quantity caused by thermal fatigue, in the same manner as the above mentioned fifth aspect to the eleventh aspect of the present invention.

BEST MODE FOR CARRYING OUT THE INVENTION

Embodiments of the life estimation device for an engine and machine having a heat source in accordance with the present invention will now be described with reference to the accompanying drawings.

The present embodiment is based on the assumption that the time of overhaul, that is, the end of life of a diesel engine to be mounted in a construction machine, is estimated. Although the present embodiment is based on the assumption that a diesel engine of a construction machine is used, the present invention can be applied to an engine mounted in various machines, and can be applied to any engine, including a gasoline engine, which does not have a control rack.

At first, an embodiment to accurately estimate the life of an engine by representing the accumulation of the load exerted on the engine by numerics as damage quantity will be described.

Figure 1:
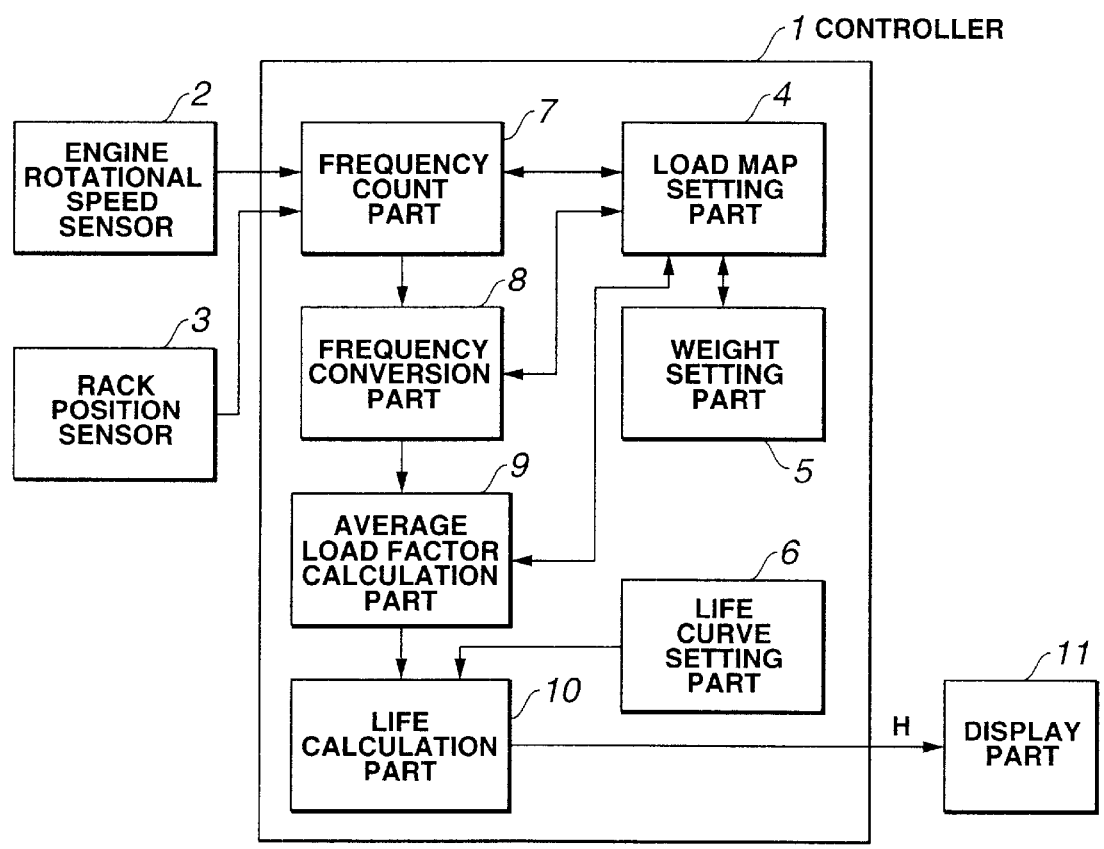
FIG. 1 is a block diagram depicting the device configuration of an embodiment of the life estimation device for an engine in accordance with the present invention.

The life estimation device to implement this is configured as shown in the functional block diagram shown in FIG. 1.

In a construction machine, such as a hydraulic excavator, various operation parameter values which change sequentially, such as the horse power of an engine PS (engine output), engine rotational speed Ne, torque T, control rack position V of the governor of the fuel injection pump (hereafter rack position V), load exerted on each work machine, stroke quantity of the hydraulic cylinder of each work machine, hydraulic pressure in the hydraulic drive circuit and blow-by pressure of the engine, are detected by sensors appropriately disposed at each part of the construction machine during operation of the construction machine so as to control the drive of the construction machine.

For these sensors, conventional sensors normally disposed to receive feedback signals for control during the drive control of the construction machine, (e.g. engine rotational speed sensor), can be used, and it is unnecessary to dispose a new sensor only for the life estimation device.

In the present embodiment, one operation parameter or two or more operation parameters indicative of the load exerted on the engine required for estimating the life of the engine are selected from these operation parameters. In the present embodiment, the engine rotational speed Ne and rack position (fuel consumption) V are selected as the operation parameters indicative of the load exerted on the engine.

The rack position is equivalent to the consumption of fuel to be injected into the cylinder of the engine and substitutes the torque T of the engine.

Another operation parameter, rather than the rack position V, may be used only if the operation parameter indicates the fuel consumption and engine torque. Horse power PS of the engine may be used instead of the rack position V.

In the present embodiment, as FIG. 1 shows, the detection signals of the engine rotational speed sensor 2 for detecting the engine rotational speed Ne (r.p.m.) and of the rack position sensor 3 for detecting the rack position V as the voltage value are input to the controller 1 for engine life estimation, which is comprised with the CPU at the center, later mentioned processing is executed by this controller, and the processing result, which is the estimated life, is displayed on the display part 11 disposed at a position visible to the operator. The processing result of the controller may be viewed at a predetermined location outside the construction machine, by connecting the controller inside the construction machine and a personal computer outside the construction machine via a predetermined communication means.

Figure 2:
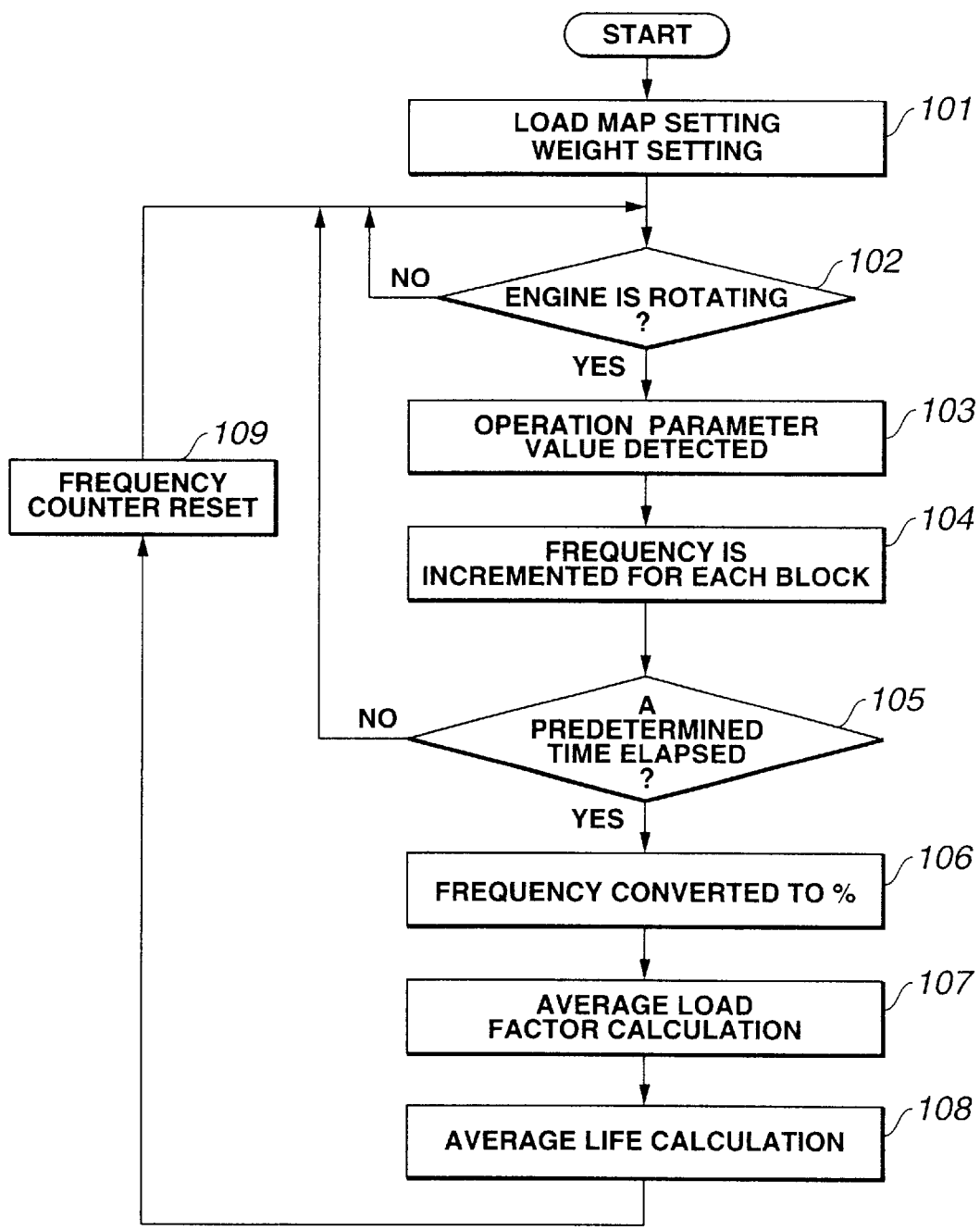
FIG. 2 is a flow chart depicting the processing procedure of the embodiment shown in FIG. 1.

FIG. 2 is a flow chart depicting a processing procedure to be executed by the above mentioned controller 1. The content of processing to be executed by each part of the controller 1 shown in FIG. 1 will now be described with reference to this flow chart and the graphs in FIG. 3 to FIG. 7.

Figure 3:
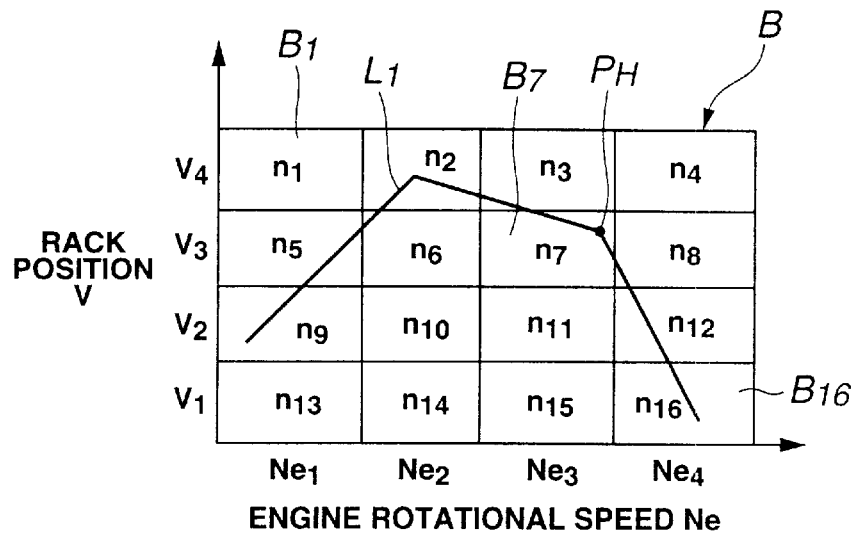
FIG. 3 is a drawing depicting the correspondence of the detection frequency and each area of a load map.

At first, as shown in FIG. 3 where the abscissa is the engine rotational speed Ne and the ordinate is the rack position V, combinations of these operation parameter values Ne and V are divided into a plurality of areas (each block) B1, B2, ... B16. In other words, the engine rotational speed Ne is divided into four levels, Ne1, Ne2, Ne3 and Ne4, and the rack position V is divided into four levels, V1, V2, V3 and V4, then sixteen areas, B1–B16, are determined by the combination of Ne1 Ne2, Ne3 and Ne4, and V1, V2, V3 and V4.

In this way, the two-dimensional load map indicative of the distribution of the magnitude of the load exerted on the engine is set. For convenience of explanation, the number of divisions of the load map B is assumed to be sixteen here, but a division less than sixteen is possible, and division more than sixteen is also possible.

L1 indicates the torque characteristic of the engine, and PH indicates the rated point. The largest load is exerted on the engine when the combination of the operation parameter values Ne and V belongs to the area B7 where the rated point PH belongs.

Figure 5:
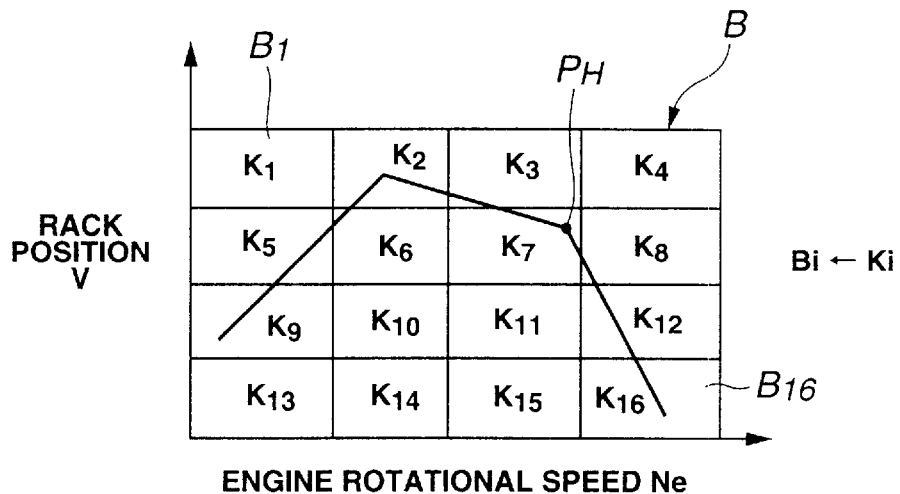
FIG. 5 is a diagram depicting the correspondence of the weight and each area of a load map.

So, as FIG. 5 shows, a weight ki in accordance with the magnitude of the load in the area Bi (i=1–16) is set for each area B1, B2, ... B16 of the load map B.

In other words, for the area B7 at a high load where the rated point PH belongs to, the maximum weight k7 is set, and for the area at a low load, the area B3, for example, the minimum weight k13 is set.

Such a setting of the load map B is executed by the load map setting part 4 of the controller 1, and setting of the weight ki is executed by the weight setting part 5 (Step 101).

Then whether the engine is actually operating is judged for collecting the operation parameter values Ne and V while the engine is operating.

In other words, whether the engine is rotating is judged based on the output of the engine rotational speed sensor 2 (Step 102).

If it is judged that the engine is rotating, processing in the following Steps 103 to 108 is executed.

Then, the operation parameter values Ne and V are detected at each predetermined interval Δt, every 10 mmsec, for example, while the engine is operating (Step 103).

Then, based on these detected operation parameter values Ne and V, the number of times ni when the operation parameter values Ne and V belonging to the area Bi are detected is counted until a predetermined time τ, two hours for example, elapses for each area B1, B2, . . . B16 of the load map B. Here let us assume that the total number of times of detection during a predetermined time τ (two hours) is N (720,000 times).

Figure 7:
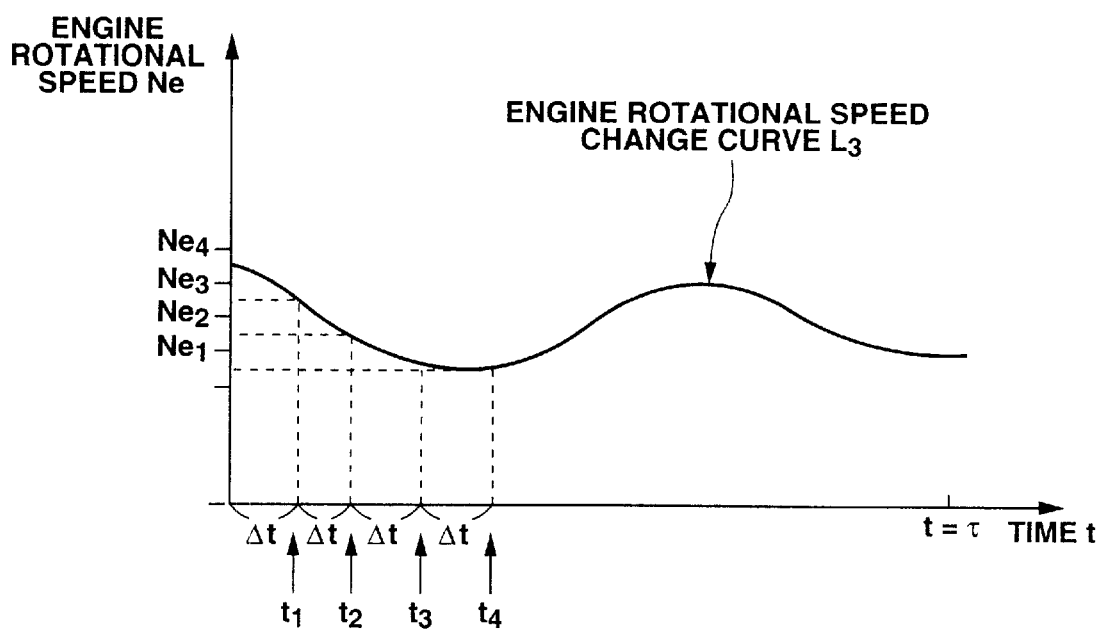
FIG. 7 is a diagram depicting the change of engine rotational speed in a time sequence.

In other words, the graph in FIG. 7 shows the engine rotational speed change curve L3 where the engine rotational speed Ne changes along with the lapse of the time t, and the value Ne at each predetermined interval Δt is detected by the engine rotational speed sensor 2.

And, which level of the four levels, Ne1 Ne2, Ne3 and Ne4 the detection value Ne of the sensor 2 belongs to, is judged at each predetermined interval Δt. In the same way, which level of the four levels, V1, V2, V3 and V4 the detection value V of the rack position sensor 3 belongs to, is judged at each predetermined interval Δt.

In this way, the level of Ne1 Ne2, Ne3 and Ne4, where the engine rotational speed belongs to and the level of V1, V2, V3 and V4, where the rack position belongs to, are specified at each predetermined interval Δt, so one of the areas B1–B16 is specified at each predetermined interval Δt. When the area Bi, where the operation parameters Ne and V belong to, is specified at each predetermined interval Δt, the detection frequency ni of that area Bi is incremented sequentially by +1. For example, if the level of the engine rotational speed is Ne1 and the level of the level of the rack position is V1 at time t3, +1 is added to the detection frequency n13 of the area B13.

In this way, the detection frequency ni is counted for each area Bi, as shown in FIG. 3, and the detection frequency ni is integrated until a predetermined time τ elapses (Step 104).

In other words, it is judged whether a predetermined time τ (e.g. two hours) has elapsed since the start of counting (Step 105), and if this predetermined time τ has not elapsed, the above processing for counting and integrating the detection frequency ni is repeated as long as the engine is rotating (Steps 102–104). If the above predetermined time τ has elapsed, on the other hand, processing for counting the detection frequency ni is ended here.

The counting of the frequency ni is executed by the frequency count part 7.

Figure 4:
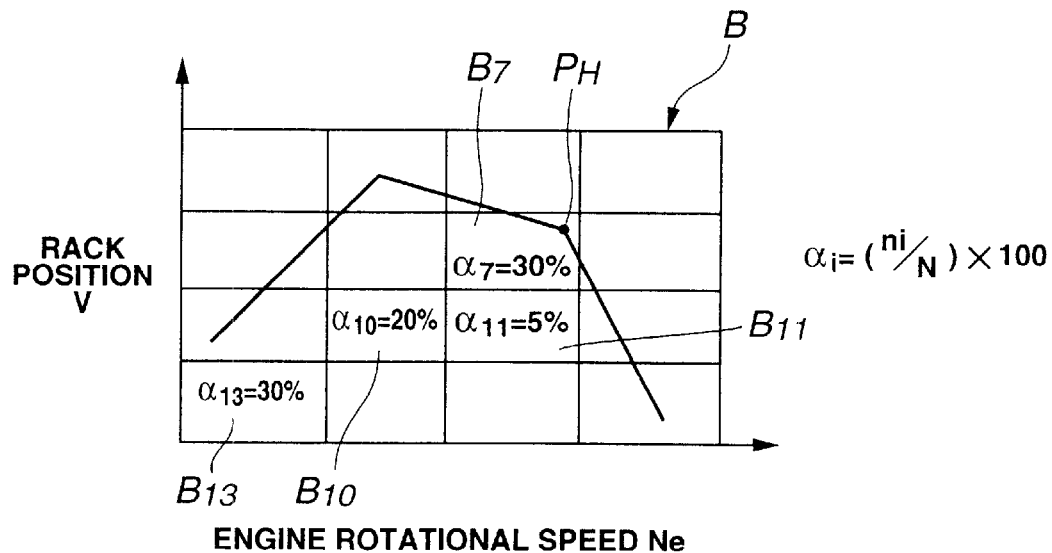
FIG. 4 is a diagram depicting the correspondence of the detection frequency converted to % and each area of a load map.

Then, the frequency conversion part 8 divides the detection frequency ni until a predetermined time τ elapses by the total number of times of detection N, as shown in FIG. 4, so as to convert the detection frequency ni to %.

The frequency αi converted to % this way, that is, αi=(ni/N)·100(%) indicates the ratio of time belonged to the area Bi, within the predetermined time τ.

For example, if the frequency α7 converted to % in the area B7 is 30%, this means that the operation parameters Ne and V belonging to this area B7 were detected during 30% (0.6 hours) of the predetermined time τ (two hours).

Converting the detection frequency ni to % is to decrease the capacity of the memory. If the storage capacity of the memory is big enough, the detection frequency ni can be directly used for subsequent calculations, instead of the frequency αi converted to %. Also, the detection time (ni/N)·τ for each area Bi may be used for subsequent calculations, instead of αi, since critical here is to determine the time detected for each area Bi (Step 106).

Then, the average load factor calculation part 9 executes weighting αi·ki for the detection frequency αi converted to % in accordance with the weight ki set by the weight setting part 5, so that the average load factor which indicates the actual damage quantity exerted on the engine (primarily mechanical fatigue exerted on the engine) until a predetermined time τ elapses is calculated as follows.

$$\delta = \sum_i \alpha i \cdot ki \qquad (1)$$

As the above formula (1) shows, the average load factor 6 indicates a greater value as the operating time in the area Bi having a large load in the load map B becomes longer (Step 107).

Figure 6:
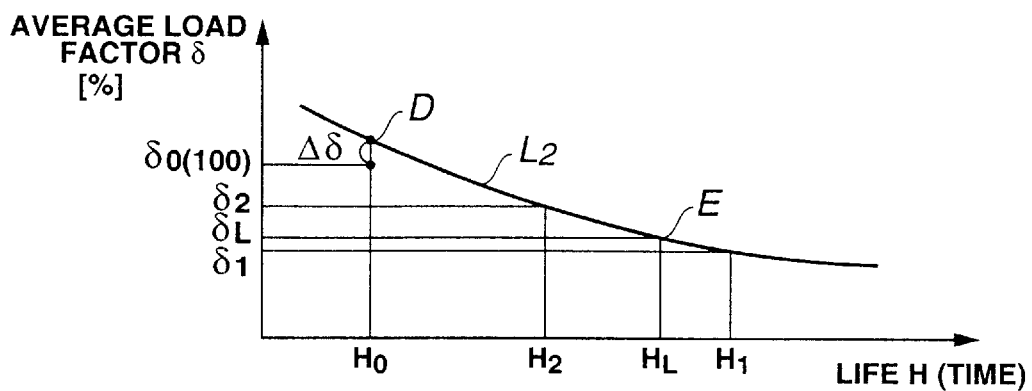
FIG. 6 is a diagram depicting the correspondence relationship between the average load factor and the life of the engine.

When an engine is developed, endurance testing and parts inspections after testing are executed in advance, and the correspondence relationship L2 between the magnitude of the damage quantity δ and the length H of the average life of the engine is preset, as shown in FIG. 6.

In other words, the load factor δ0 at 100% corresponds with the time H0 when a predetermined endurance test is executed. Then, a predetermined margin Δδ is added to the load factor δ0 and the point D is plotted. And, from the inspection result on the abrasion and the damage of the parts after the endurance test, the load factor δL under general operation conditions and the life HL under the generation operation conditions are experientially determined, and the point E corresponding to this is plotted.

Then, as the curve connecting the point D and point E, the correspondence relationship L2 between the magnitude of the damage quantity δ and the length H of the average life of the engine is determined. This average life curve L2 is the average of the engine in general, and actually has a margin because of dispersion during manufacturing the respective engine. This average life curve L2 is different depending on the model of the engine and the type of parts constituting the engine.

This average life curve L2 is preset at the life curve setting part 6.

If the actual damage quantity δ was value δ1 in the calculation of the above formula (1), the life calculation part 10 determines the life H1 corresponding to the damage quantity δ1 from the preset correspondence relationship L2, and the determined life H1 is output to the display part 11 as the estimated life of the engine. If the damage quantity is δ2, then the estimated life H2 corresponding to δ2 is output to the display part 11.

In this way, the damage quantity δ1 and δ2 exerted on the engine are accurately represented by numerics, and the lives H1 and H2 of the engine can be automatically and accurately estimated without expert skills (Step 108).

Then, the counting result ni of the frequency count part 7 is reset to zero (Step 109), and the same processing in Steps 102 to 108 is repeatedly executed thereafter. In other words, the life H of the engine is re-estimated each time a predetermined time τ elapses, so that the estimation result of the life H of the engine is accurately corrected, even when the operation conditions of the engine change.

If the damage quantity determined at each predetermined time τ is δk (k=1, 2, . . . ) and the estimated life Hk corresponding to this damage quantity is determined, then the residual life HLf is determined based on the following formula (2), where SMR is the current cumulative time of operation (measured value of the operation service meter).

$$HLf = Hk - SMR \qquad (2)$$

The present embodiment is based on the assumption that the life of the engine itself is estimated, but life may be estimated for each type of parts constituting the engine.

In this case, the life curve shown in FIG. 6 is predetermined for each type of parts constituting the engine. The value of the weight ki in accordance with the magnitude of the load shown in FIG. 5 may differ depending on the type of parts constituting the engine.

Also, the present embodiment is based on the assumption that a two-dimensional map is used for the load map B, but a one-dimensional map or three- or more dimensional map may be used. For example, a one-dimensional map indicative of the distribution of the magnitude of the torque T of the engine can be used as the load map.

Whereas the above embodiment determines the damage quantity exerted on the engine which is determined from the load value itself, an embodiment where the damage quantity exerted on the engine is determined considering the fluctuation quantity of the load will be described next.

In the present embodiment, one operation parameter or two or more operation parameters indicative of the load exerted on the engine or engine rotational speed required for estimating the life of the engine are selected from the operation parameters which values change while the engine is operating. In the present embodiment, two operation parameters, the engine rotational. speed Ne and the rack position (fuel consumption) V, are selected as the operation parameters.

The rack position is equivalent to the consumption of fuel to be injected into the cylinders of the engine, and substitutes the torque T of the engine.

Another operation parameter, rather than the rack position V, may be used only if the operation parameter indicates the fuel consumption or the engine torque. An operation parameter indicative of the horse power PS of the engine may be used instead of the operation parameter indicative of the torque T of the engine.

Also, either the engine rotational speed Ne or the rack position V may be used instead of using the two operation parameters.

Figure 8A:
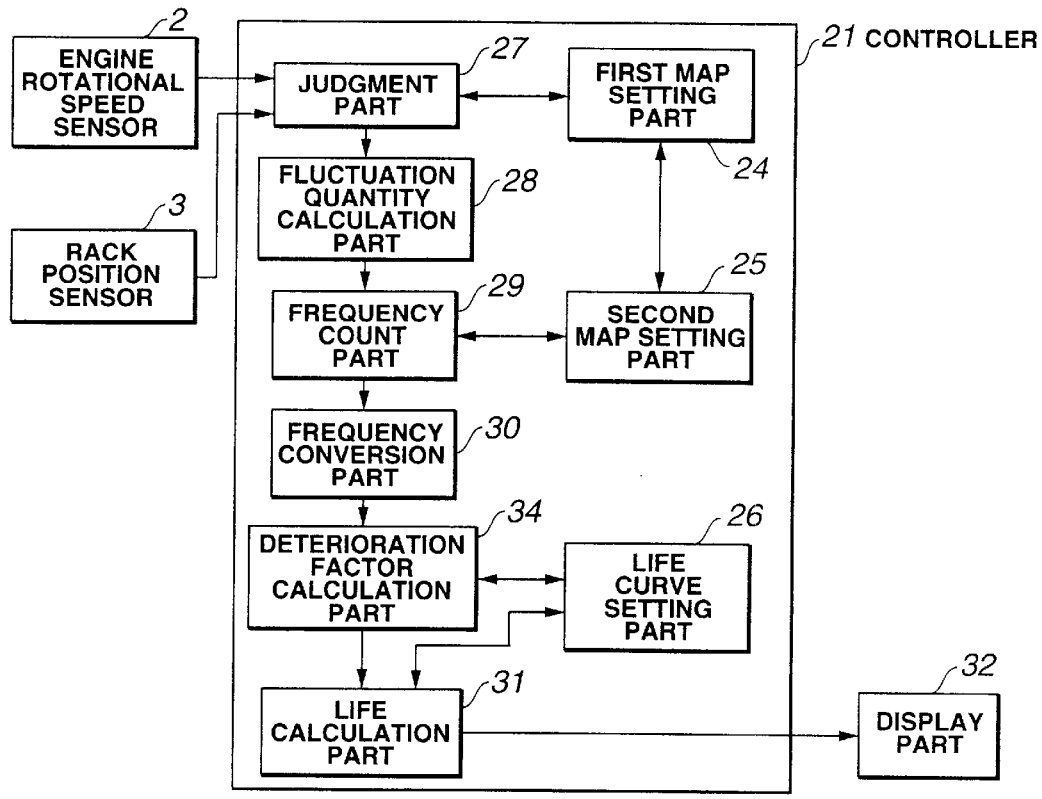
FIGS. 8($a$) and 8($b$) are block diagrams depicting the device configuration of the embodiments of the life estimation device for an engine in accordance with the present invention.

In the present embodiment, as FIG. 8(a) shows, the detection signals of the engine rotational speed sensor 2 for detecting the engine rotational speed Ne (r.p.m.) and of the rack position sensor 3 for detecting the rack position V as the voltage value are input to the controller 21 for the engine life estimation, which is comprised with the CPU at the center, later mentioned processing is executed by this controller, and the processing result, which is the estimated life, is displayed on the display part 32 disposed at a position visible to the operator. The processing result of the controller may be viewed at a predetermined location outside the construction machine by connecting the controller inside the construction machine and a personal computer outside the construction machine via a predetermined communication means.

Figure 9:
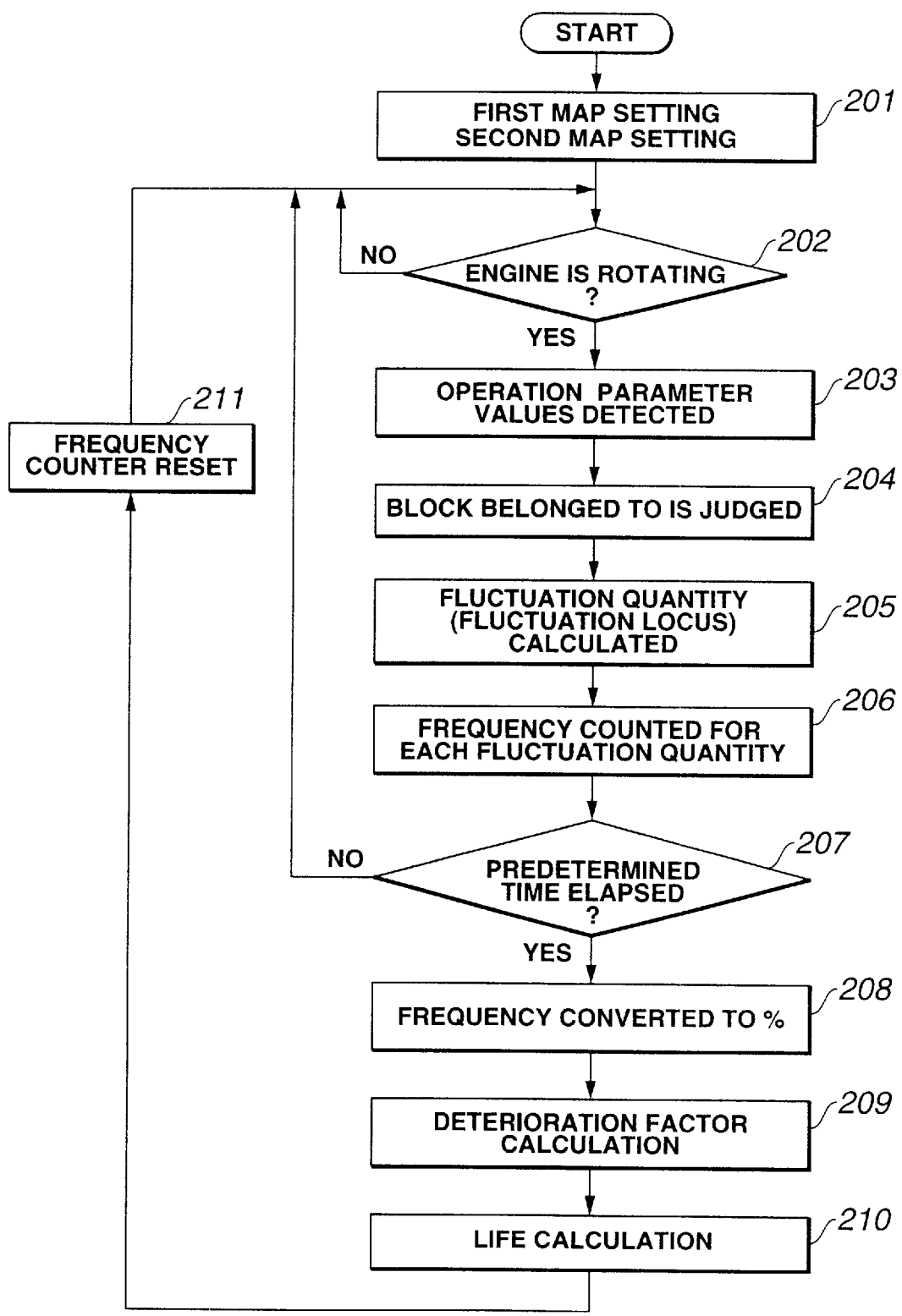
FIG. 9 is a flow chart depicting the processing procedure of the embodiment shown in FIGS. 8($a$) and 8($b$)

FIG. 9 is a flow chart depicting a processing procedure to be executed by the above mentioned controller 21. The content of the processing to be executed by each part of the controller 21 shown in FIG. 8(a) will now be described with reference to this flow chart and the graphs in FIGS. 10 to 16, FIG. 21 and FIG. 22.

Figure 10:
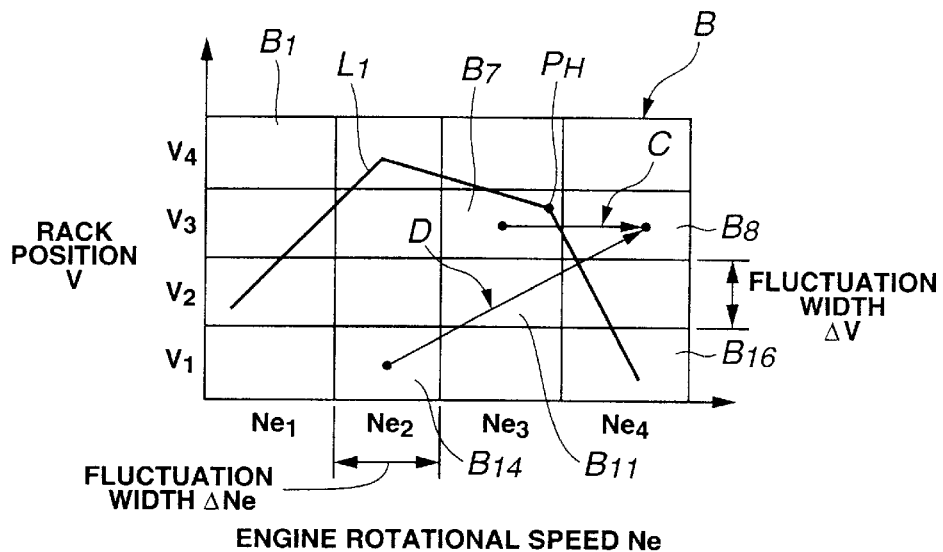
FIG. 10 is a diagram depicting the first map to be used for the device shown in FIG. 8($a$)

At first, as shown in FIG. 10, where the abscissa is the engine rotational speed Ne and the ordinate is the rack position V, combinations of these operation parameter values Ne and V are divided into a plurality of areas (each block) B1, B2, . . . B16. In other words the engine rotational speed Ne is divided into four levels, Ne1, Ne2, Ne3 and Ne4, and the rack position V is divided into four levels, V1, V2, V3 and V4, then sixteen areas, B1–B16, are determined by the combination of Ne1 Ne2, Ne3 and Ne4 and V1, V2, V3 and V4.

Here, $\Delta Ne$ is set as the unit fluctuation width of the engine rotational speed Ne, and $\Delta A$ is set as the fluctuation width of the rack position V. These unit fluctuation widths correspond to the vertical and horizontal sizes of the area Bi.

For example, if the operation status of the engine changes for one area in the horizontal direction from area B7 to area B8, as the locus C shows, then the engine rotational speed Ne is regarded as having changed for the unit fluctuation width $\Delta Ne$ (no change in the rack position). If the engine operation status changes for three areas in the horizontal direction and for three areas in the vertical direction, from the area B14 to the area B8, as the locus D shows, then the engine rotational speed Ne is regarded as having changed for $3\Delta Ne$, that is, three times the unit fluctuation width $\Delta Ne$, and the rack position V is regarded as having changed for $3\Delta V$, that is, three times the unit fluctuation width $\Delta V$.

In this way, the two-dimensional first map B is set. The number of divisions of the first map B is assumed to be sixteen here, for convenience of explanation, but division less than sixteen is possible, and division more than sixteen is also possible.

L1 indicates the torque characteristic of the engine, and PH indicates the rated point. The largest load is exerted on the engine when the combination of the operation parameter values Ne and V belongs to the area B7 where the rated point PH belongs to.

Figure 11:
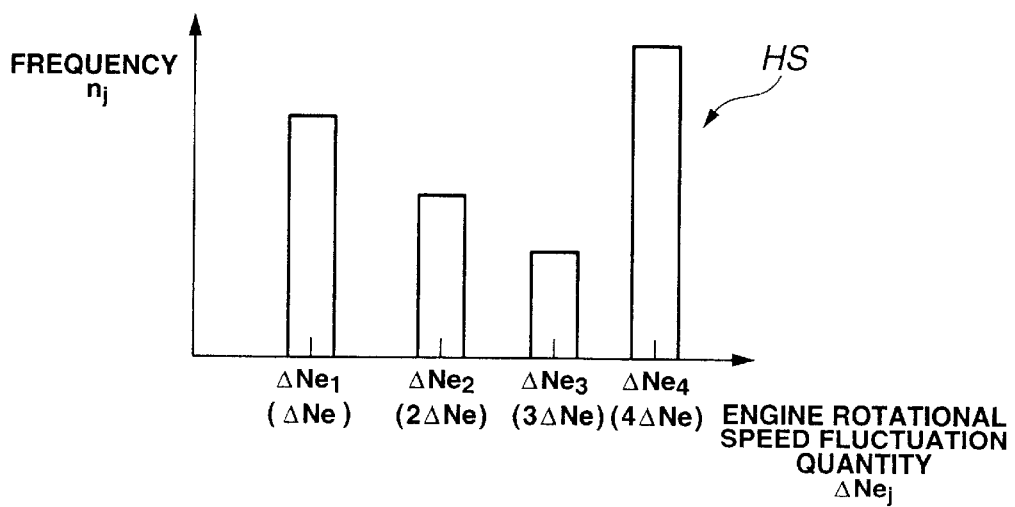
FIG. 11 is a diagram depicting the second map to be used for the device shown in FIG. 8($a$)

Also, as FIG. 11 shows, a second map HS indicative of the distribution of the magnitude of the fluctuation quantity $\Delta Nej$ of the operation parameter per unit time is set.

In the abscissa of the second map HS, the magnitudes of the fluctuation quantity $\Delta Nej$ (j=1, 2, 3, 4) of the engine rotational speed, that is, $\Delta Ne1$ (unit fluctuation width $\Delta Ne$), $\Delta Ne2$ ($2\Delta Ne$ which is two times the unit fluctuation width $\Delta Ne$), $\Delta Ne3$ ($3\Delta Ne$ which is three times the unit fluctuation width $\Delta Ne$), and $\Delta Ne4$ ($4\Delta Ne$ which is four times the unit fluctuation width $\Delta Ne$) are plotted.

Figure 12:
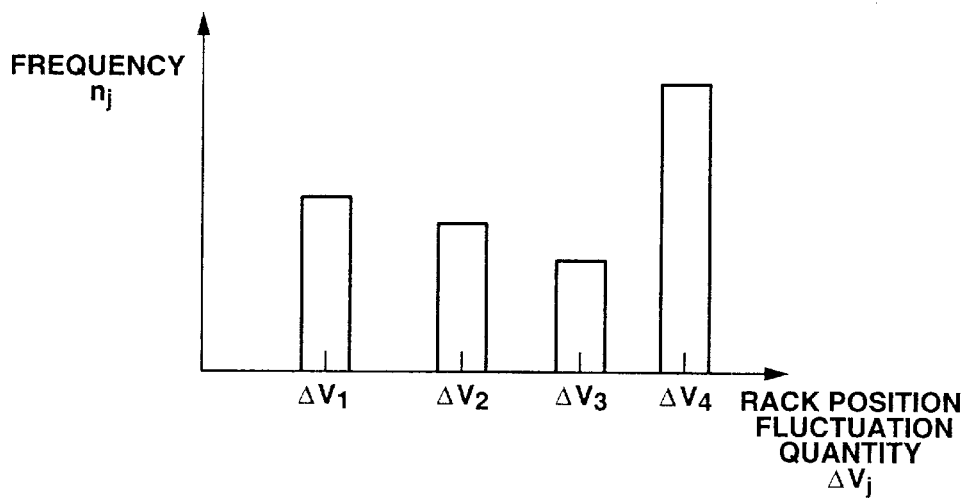
FIG. 12 is a diagram depicting the second map to be used for the device shown in FIG. 8($a$)

In the present embodiment, the distribution of the magnitude of the fluctuation quantity $\Delta Nej$ of the engine rotational speed is set as the second map HS, but the distribution of the magnitude of the fluctuation quantity $\Delta Vj$ of the rack position may be set instead, as shown in FIG. 12. Also, both the distribution of the magnitude of the fluctuation quantity $\Delta Nej$ of the engine rotational speed and the distribution of the magnitude of the fluctuation quantity $\Delta Vj$ of the rack position may be set.

Such a setting of the first map B as described above is executed by the first map setting part 24 of the controller 1, and the setting of the second map HS is executed by the second map setting part 25 (Step 201).

Then, whether the engine is actually operating is judged to collect the operation parameter values Ne and V while the engine is operating.

In other words, whether the engine is rotating, is judged based on the output of the engine rotational speed sensor 2 (Step 202).

If it is judged that the engine is rotating, processing in the following Steps 203–210 is executed.

Then, the operation parameter values Ne and V are detected at each predetermined interval $\Delta t$, every 10 mmsec. while the engine is operating (Step 203).

Then, which area Bi of the first map B the operation parameter values Ne and V, which are detected at each predetermined interval $\Delta t$, belongs to, is judged at each predetermined interval $\Delta t$.

In other words, the graph in FIG. 7 shows the engine rotational speed change curve L3 where the engine rotational speed Ne changes along with the lapse of the time t, and the value Ne at each predetermined interval Δt is detected by the engine rotational speed sensor 2.

And, which level of the four levels, Ne1, Ne2, Ne3 and Ne4, the detection value Ne of the sensor 2, belongs to, is judged at each predetermined interval Δt.

In the same way, which level of the four levels, V1, V2, V3 and V4 the detection value V of the rack position sensor 3, belongs to, is judged at each predetermined interval Δt.

In this way, which level of Ne1, Ne2, Ne3 and Ne4, the engine rotational speed belongs to and which level of V1, V2, V3 and V4, the rack position belongs to, are specified at each predetermined interval Δt. Therefore, which area of the area B1–B16 belong to, and which area of the area Bi of the first map, are specified at each predetermined interval Δt. Such judgment processing is executed by the judgment part 27 of the controller 21 (Step 204).

Then, in the fluctuation calculation part 28 of the controller 21, based on the areas judged sequentially by the judgment part 27, the fluctuation widths ΔNe, 2ΔNe, 3ΔNe and 4ΔNe between the areas fluctuated per unit time are calculated as the fluctuation quantity of the operation parameter Ne per unit time. For the unit time, the above mentioned predetermined interval (sampling interval) Δt, for example, is set.

For example, if the engine rotational speed Ne changes for the unit fluctuation width ΔNe from the area B7 to the area B8 during the unit time Δt, as the locus C in FIG. 10 shows (no change in the rack position), then the fluctuation quantity of the engine rotational speed is calculated as ΔNe. Also, if the engine rotational speed Ne changes for 3ΔNe, that is, three times the unit fluctuation width ΔNe, from the area B14 to the area B8, during the unit time Δt, as the locus D in FIG. 10 shows, then the fluctuation quantity of the engine rotational speed is calculated as 3ΔNe (Step 205).

Then, in the frequency count part 29, the frequency nj of calculating the fluctuation quantity in this way is counted for each magnitude of the fluctuation quantity of the second map HS, that is, for ΔNe1, ΔNe2, ΔNe3 and ΔNe4, as shown in FIG. 11, and is integrated until the predetermined time τ elapses. For example, if the level of the engine rotational speed is Ne2 at qtime t2, as shown in FIG. 7, and the level of the engine rotational speed is Ne1 at time t3, +1 is added to the detection frequency n1 of ΔNe1 of the second map HS, since the fluctuation quantity of the engine rotational speed per unit time Δt is the unit fluctuation width ΔNe.

The predetermined time τ is two hours for example, and the total frequency (including the frequency to calculate fluctuation quantity 0) during the two hours is assumed to be N (720,000 times) (Step 206).

Then, it is judged whether the predetermined time τ (e.g. two hours) has elapsed since the start of counting (Step 207), and if this predetermined time τ has not elapsed, the above processing for counting and integrating the frequency nj is repeated as long as the engine is rotating (Steps 202–206). If the above predetermined time τ has elapsed, on the other hand, processing for counting the frequency nj is ended here.

Counting the frequency nj is executed by the frequency count part 29.

The second map HS shown in FIG. 11 can be created by normalizing all data, which is obtained by sampling the operation parameters Ne and V at each predetermined interval Δt, using the known "Rain flow method".

In the above mentioned embodiment the first map B is set, and the fluctuation quantity ΔNej of the operation parameters per unit time is determined based on the assumption that the operation parameter Ne, which is detected sequentially at each predetermined interval Δt, takes the center value (or representative value) of the area Bi of the first map B, that is, one of Ne1 Ne2, Ne3 and Ne4, but the operation parameter value Ne, which is detected sequentially at each predetermined interval Δt, may be normalized directly by the "Rain flow method" without converting to the central value (or representative value) of the area Bi of the map B, and the fluctuation quantity ΔNej of the operation parameter per unit time is determined to create the second map HS.

In the present embodiment, the magnitude of the fluctuation quantity of the second map HS is set to a multiple of the unit fluctuation width ΔNe in accordance with the width of the area Bi of the first map B, but this is not restricted, and the magnitude of the fluctuation quantity of the second map HS can be set to any magnitude.

All data obtained by sampling the operation parameters Ne and V at each predetermined interval Δt may be converted to the horse power PS or the torque T of the engine, and create the second map HS, where the abscissa is the magnitude of the fluctuation quantity of the horse power PS of the engine or the second map HS, where the abscissa is the magnitude of the fluctuation quantity of the torque T of the engine, by the "Rain flow method".

The second map HS indicative of the frequency for each magnitude of the fluctuation quantity of the operation parameter created in this way represents the operation tendency of the engine.

For example, by creating the second map indicative of the frequency for each magnitude of the fluctuation quantity of the engine rotational speed and the second map indicative of the frequency for each magnitude of the fluctuation quantity of the engine horse power, the characteristic of the operation of the engine, such as "fluctuation of horse power during operation is small but rotational fluctuation is large" or "fluctuation of rotation during operation is small but fluctuation of horse power is large", can be easily known from these second maps.

Figure 13:
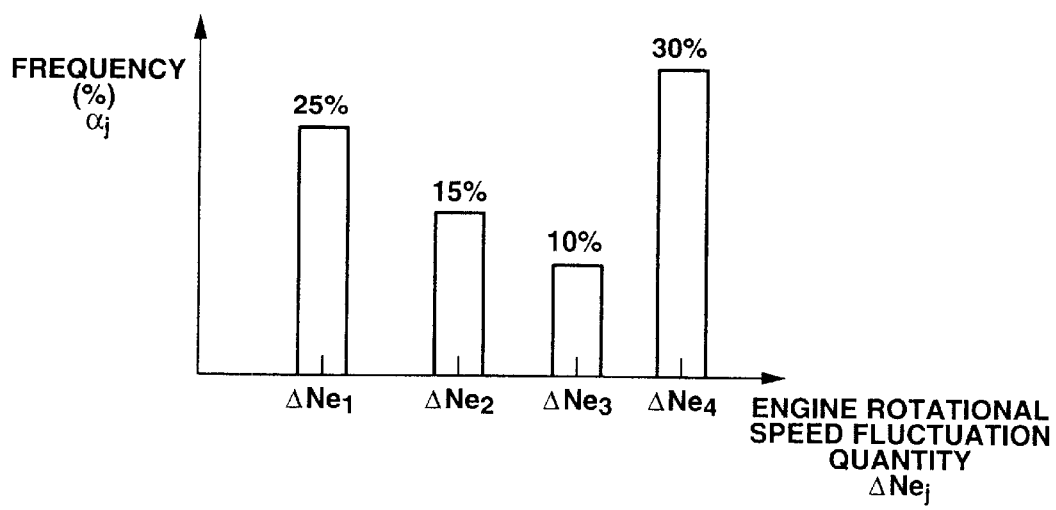
FIG. 13 is a diagram depicting the frequency converted to % in the second map to be used for the device shown in FIG. 8($a$)

Then, the frequency conversion part 30 divides the frequency nj until the predetermined time τ elapses by the total frequency N, as shown in FIG. 13, so as to convert the frequency nj to %.

The frequency αj converted to % in this way, that is, αj=(nj/N)·100 (%), indicates the ratio of the time when the fluctuation quantity is ΔNej to the predetermined time τ.

For example, if the frequency α1 of the fluctuation quantity ΔNe1 converted to % is 25%, this means that the engine rotational speed fluctuated at the magnitude of ΔNe1 during 25% (0.5 hours) of the predetermined time τ (two hours).

Converting the frequency nj to % is to decrease the capacity of the memory. If the storage capacity of the memory is big enough, then the detection frequency nj may be directly used for the subsequent calculations, instead of the frequency αj converted to % (Step 208).

Then, the deterioration factor calculation part 34 executes the weighting αj·kj for the above frequency αj converted to % in accordance with the weight kj set by the life data setting part 26, so that the deterioration factor which indicates the actual damage quantity exerted on the engine (primarily abrasion of the engine) until a predetermined time τ elapses, is calculated as follows.

$$\gamma f = \sum_j \alpha i \cdot kj \quad (3)$$

Figure 21:
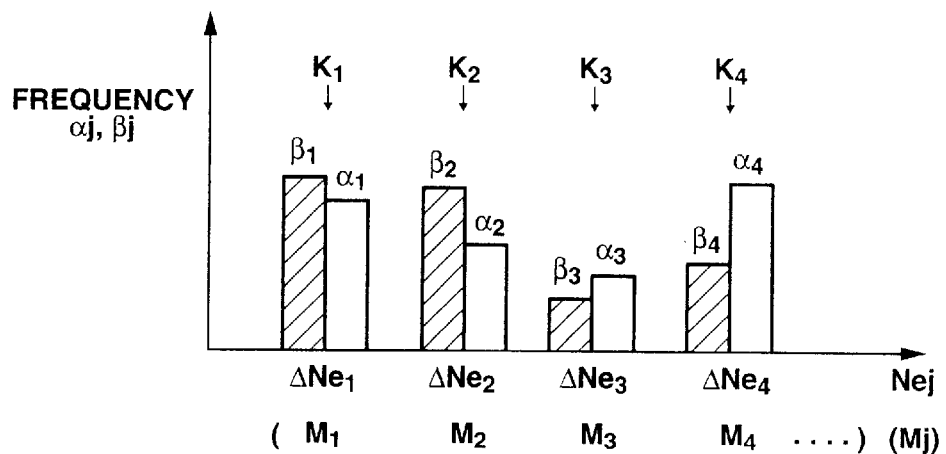
FIG. 21 is a diagram depicting the data to be preset.

In other words, the shaded portion in FIG. 21 is a map corresponding to the second map HS in FIG. 13, which is obtained by executing the endurance test in advance during development of the engine. By operating the engine under the conditions of the endurance test, the frequency βj converted to % of the magnitude ΔNej of the fluctuation quantity of the engine rotational speed is determined. And, the weight kj in accordance with the degree of abrasion of the engine is set for each magnitude ΔNej of the fluctuation quantity of the engine rotational speed. This weight kj is set experientially during the endurance test.

The above frequency βi and the weight ki may be set in the life data setting part 26 by calculating theoretical values.

Therefore, the deterioration factor γt under the conditions of the endurance test is determined by the following formula (4) in the same way as the above formula (3), and is set.

$$\gamma t = \sum_j \beta j \cdot kj \quad (4)$$

As the above formula (3) shows, the deterioration factor γf is the fluctuation quantity ΔNei with a large weight ki (abrasion is large), and indicates a greater value as the time, where the engine rotational speed changes, increases.

The average life Lt of the engine under the conditions of the endurance test is also preset. The average life Lt under the conditions of the endurance test is experientially estimated (Step 209).

So, in the life calculation part 31, the average life Lf when the engine is actually operating is estimated in accordance with the following formula (5) based on the correspondence relationship between the preset deterioration factor γt under the conditions of the endurance test and the average life Lt corresponding to the deterioration factor γt.

$$Lf = (\gamma t / \gamma f) \cdot Lt \quad (5)$$

This determined life Lf is output to the display part 32 as the estimated life of the engine.

In this way, the deterioration factor γf, which is an index indicative of the damage quantity exerted on the engine, is actually represented by numerics, and the life Lf of the engine can be automatically and accurately estimated without expert skills (Step 210).

Hereafter, the counting result nj of the frequency count part 29 is reset to zero (Step 211), and the same processing in Steps 202–210 is repeatedly executed. In other words, the life Lf of the engine is re-estimated each time the predetermined time τ elapses.

The residual life ΔL may be determined by the following formula.

$$\Delta L = (Lf1 - SMR) \cdot (\gamma f1 / \gamma f2) \quad (6)$$

Here,

γf1: initial deterioration factor

Lf1: initial estimated life

Figure 22:
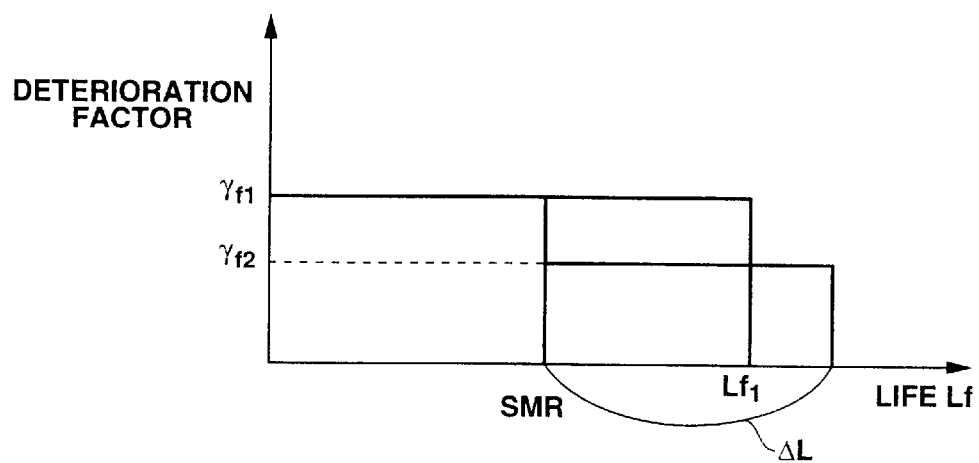
FIG. 22 is a diagram depicting the calculation of the residual life.

SMR: service meter time which elapsed from the point when the above γf1 and Lf1 were determined γf2: deterioration factor determined at the point when the above tine SMR elapsed FIG. 22 shows the relationship of these.

According to the above formula (6), when the operation status (operating conditions) of the engine changes after the initial estimated life is determined, the residual life ΔL from that point can be easily determined.

In the present embodiment, the life of the entire engine is estimated, but life may be estimated for each type of parts constituting the engine.

In this case, the value of the weight ki may differ in accordance with the magnitude of the abrasion shown in FIG. 21 depending on the type of parts constituting the engine. This is because some parts have weak resistance to major rotational fluctuations (parts easily wear out), and other parts have strong resistance to major rotational fluctuations (parts rarely wear out).

The deterioration factor γt under the endurance test conditions and the corresponding life Lt may be set for each type of parts constituting the engine.

Also, the present embodiment is based on the assumption that a two-dimensional map is used for the first map B, but a one-dimensional map or three- or more dimensional map may be used. For example, a one-dimensional map indicative of the distribution of the magnitude of the engine rotational speed Ne can be used for the first map B.

Also, various variant forms of the above described embodiment are possible.

Among the parts constituting the engine, the life of parts which are influenced by thermal load, such as valves, turbos, pistons and manifolds, are not influenced when the engine is operating in an area where the thermal load is small in the first map B.

Figure 14:
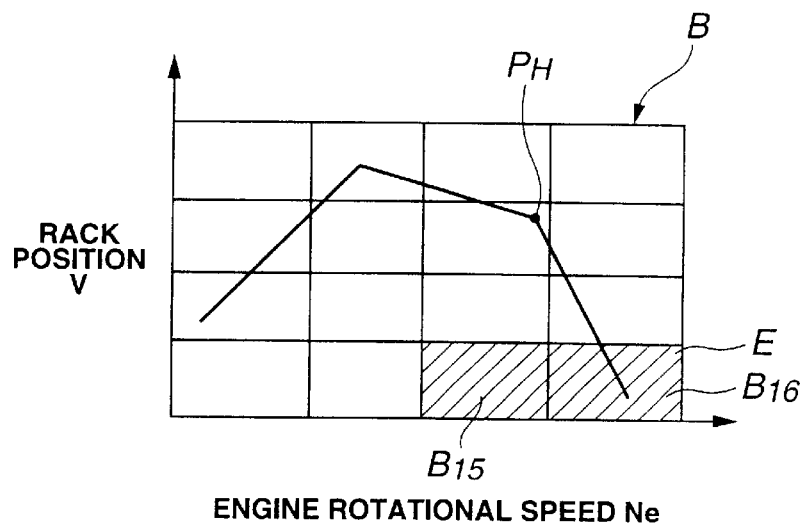
FIG. 14 is a diagram depicting the excluded area in the first map to be used for the device shown in FIG. 8($a$)

So, as FIG. 14 shows, the specific range E (B15, B16) is set (shaded portion) in accordance with the type of parts constituting the engine, and when the operation parameter values Ne and V detected at each predetermined interval Δt are in this specific detection range E, the detected data is not used for subsequent calculations (Steps 203-). In this way, the specific range E is excluded from the detection target range, then the life is estimated for each type of parts constituting the engine.

Also, the specific area E (B15, B16) is set in accordance with the type of parts constituting the engine, and this specific area E is not used for the judgment processing in Step 204. In other words, the specific area E is excluded from the target of judgment on which level Bi (i=1–16) of the first map B the operation parameter values Ne and V, which are detected at each predetermined interval Δt, belong to, then the life is estimated for each type of parts constituting the engine.

Figure 15:
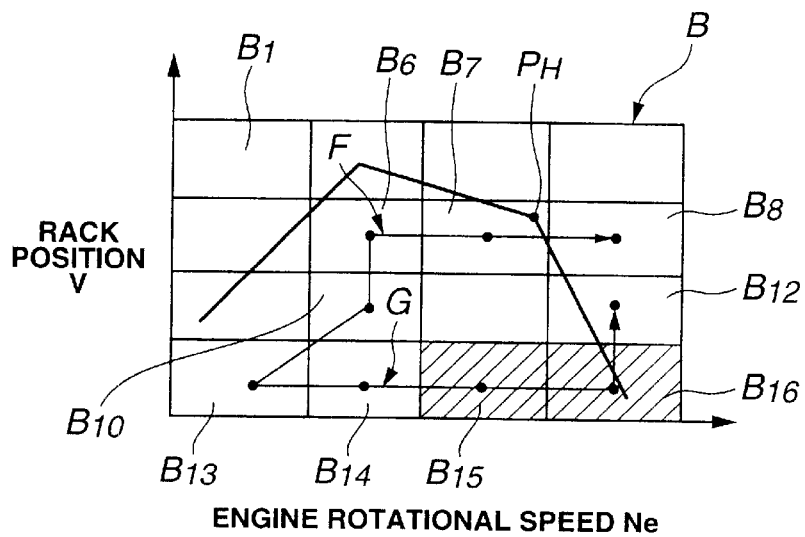
FIG. 15 is a diagram depicting the locus when the operation parameters fluctuate.

For example, as the locus G in FIG. 15 shows, even if the operation parameters change as B13→B14→B15→B16→B12, it is regarded that the areas B15 and B16 shown by the shaded portion are excluded, and the fluctuation quantity ΔNej or ΔVj is calculated and the second map HS is created regarding that the operation parameters changed as B13→B14→B12.

In the present embodiment, it is judged that the operation parameters fluctuated if the area Bi of the first map B where the operation parameter values belong change at each sampling time Δt, but if the operation parameters stayed in a same area for a short period, it may be regarded that the operation parameters did not pass this area.

Figure 16:
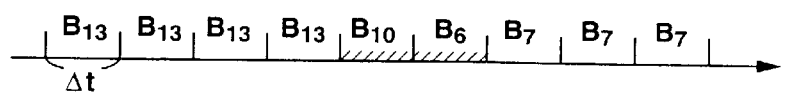
FIG. 16 is a diagram depicting the fluctuation of the first map area where the operation parameters belong to shown for each sampling interval.

For example, as the locus F in FIG. 15 shows, when the operation parameters actually change as B13→B10→B6→B7→B8, but the change at each sampling time Δt is as shown in FIG. 16, then it is regarded that the operation parameters passed the area where the operation parameters stayed 2Δt or longer (B13, B7, B8), and that the operation parameters did not pass the area where the operation parameters stayed for Δt or less (B10 and B6). In other words, the fluctuation quantity ΔNej or ΔVj is calculated, and the second map HS is created regarding that the operation parameters changed as B13→B→B8.

In the above embodiment, the fluctuation quantity map is set as the second map, and frequency is determined for each fluctuation quantity, but the fluctuation locus map may be set as the second map, and the frequency is determined for each fluctuation locus.

Figure 8B:
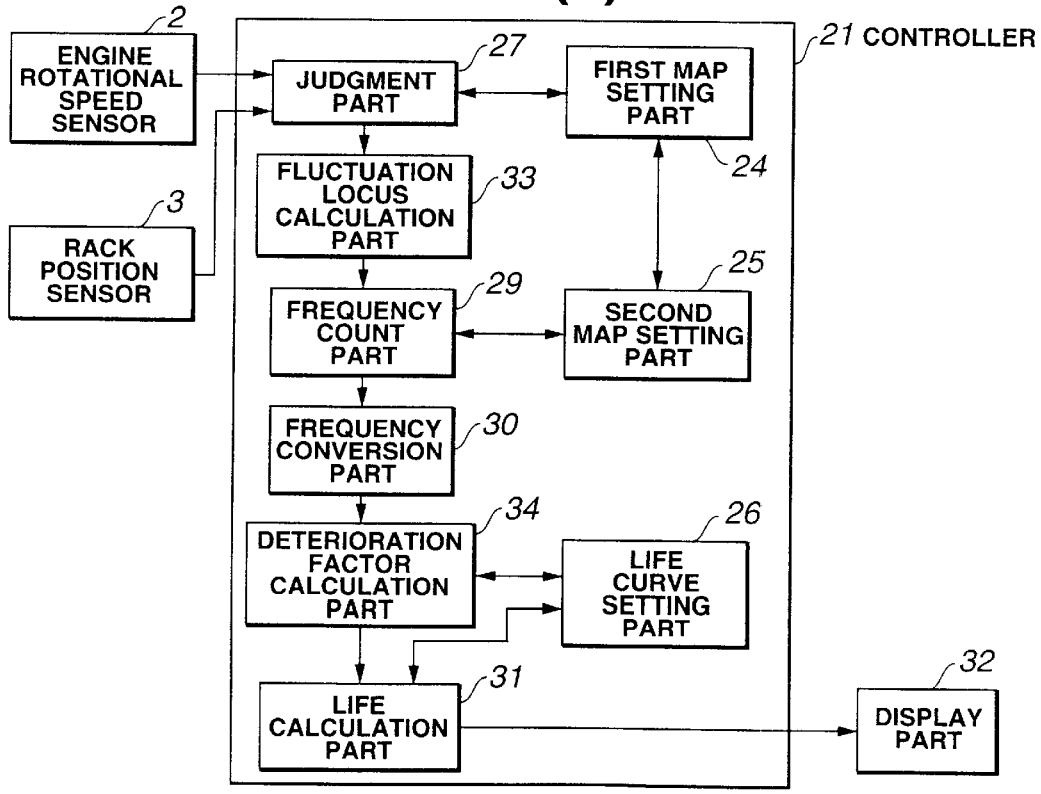

FIG. 8(b) is a block diagram depicting the device configuration of this embodiment.

The difference from FIG. 8(a) is that the fluctuation locus calculation part 33 is disposed instead of the fluctuation quantity calculation part 28.

The processing in this embodiment will now be described with reference to the flow chart in FIG. 9. Descriptions common to the embodiment in FIG. 8(a) are omitted.

Figure 17:
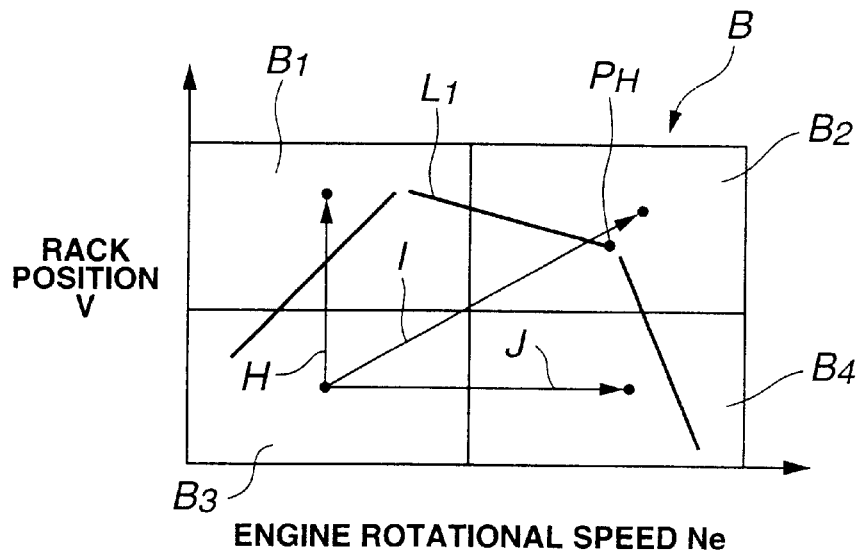
FIG. 17 is another first map to be used for the device shown in FIG. 8($b$)

At first, as shown in FIG. 17 where the abscissa is the engine rotational speed Ne and the ordinate is the rack position V, combinations of these operation parameter values Ne and V are divided into a plurality of areas (each block), B1, B2, B3 and B4, so as to set the first map B. The number of divisions is arbitrary.

Here, as the locus of the operation status of the engine is shown as, for example, H (B3→B1), I (B3→B2) and J (B3→B4), there are twelve types of fluctuation loci which change from one area to another area.

Figure 18:
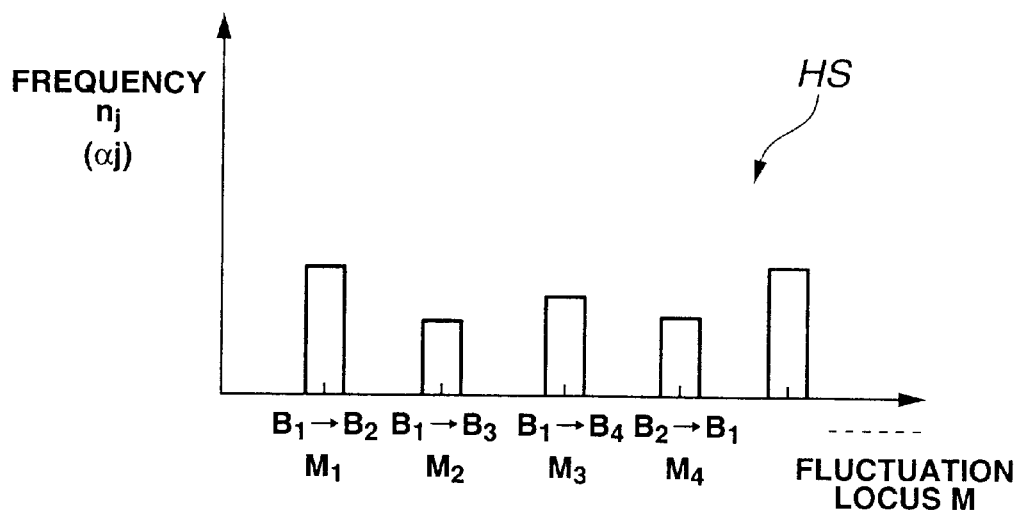
FIG. 18 is a second map to be used for the device shown in FIG. 8($b$)

Also, as FIG. 18 shows, the second map HS indicative of the distribution of the fluctuation locus type Mj (j=1–12) is set.

In the abscissa of the second map HS, the fluctuation locus type Mj, that is, M1 (B1→B2), M2 (B1→B3), M3 (B1→B4) M4 (B2→B1) . . . are plotted.

Such a setting of the above mentioned first map B is executed by the first map setting part 24 of the controller 21, and the setting of the second map HS is executed by the second map setting part 25 of the controller 21 (Step 201).

Then, whether the engine is actually operating is judged to collect the operation parameter values Ne and V while the engine is operating.

In other words, whether the engine is rotating is judged based on the output of the engine rotational speed sensor 2 (Step 202).

If it is judged that the engine is rotating, processing in the following Steps 103–108 is executed.

Then, the operation parameter values Ne and V are detected at each predetermined interval Δt, every 10 mmsec. for example, while the engine is operating (Step 203).

Then, which area Bi of the first map B the operation parameter values Ne and V, which are detected at each predetermined interval Δt, belongs to, is judged at each predetermined interval Δt.

Such judgment processing is executed by the judgment part 27 of the controller 21 (Step 204).

Then, in the fluctuation locus calculation part 33 of the controller 21, the type of the locus which fluctuated per unit time is calculated based on the area judged sequentially by the judgment part 27.

The unit time is set, for example, to the sampling interval Δt of the operation parameters Ne and V.

For example, if fluctuated from the area B1 to area B2 during the unit time Δt, then the type of the fluctuation locus is calculated as M1 (see FIG. 18) (Step 205).

Then, in the frequency count part 29, the frequency nj, which is calculated for each unit time Δt, is counted for each fluctuation locus type Mj of the second map HS and is integrated until a predetermined time τ elapses, as shown in FIG. 18. For example, if fluctuated from the area B1 to area B2 during the unit time Δt, +1 is added to the frequency n1 of the fluctuation locus type M1 of the second map in FIG. 18.

The predetermined time τ is two hours, for example, and the total frequency (including no fluctuation) during the two hours is assumed to be N (720,000 times) (Step 206).

Then, it is judged whether the predetermined time τ (e.g. two hours) has elapsed since the start of counting (Step 207), and if this predetermined time τ has not elapsed, the above processing for counting and integrating the frequency nj is repeated as long as the engine is rotating (Steps 202–206). If the above predetermined time τ has elapsed, on the other hand, processing for counting the frequency nj is ended here.

Then the frequency conversion part 30 divides the frequency nj until the predetermined time τ elapses by the total frequency N so as to convert the frequency nj to %.

The frequency αj converted to % in this way, that is, αj=(nj/N)·100 (%), indicates the ratio of the time when the fluctuation locus is Mj to the predetermined time τ.

For example, if the frequency α1 converted to % of the fluctuation locus M1 is 25%, this means that the fluctuation took place from the area B1 to the area B2 during 25% (0.5 hours) of the predetermined time τ (two hours).

Converting the frequency nj to % is to decrease the capacity of the memory. If the storage capacity of the memory is big enough, the frequency nj may be directly used for the subsequent calculations, instead of the frequency αj converted to % (Step 208).

Then, the deterioration factor calculation part 34 executes the weighting αj·kj for the above frequency αj converted to % in accordance with the weight kj set by the life data setting part 26 (see FIG. 21), so that the deterioration factor, which indicates the actual damage quantity exerted on the engine (primarily abrasion of the engine) until a predetermined time τ elapses, is calculated as follows.

$$\gamma f = \sum_j \alpha j \cdot kj \quad (3)$$

The deterioration factor γt under the conditions of the endurance test is determined by the following formula (4) in the same way as the above formula (3), and is set.

$$\gamma t = \sum_j \beta j \cdot kj \quad (4)$$

As the above formula (3) shows, the deterioration factor γf indicates a greater value as the frequency of passing the locus Mj with a large weight ki (abrasion is larger) increases.

The average life Lt of the engine under the conditions of the endurance test is also preset. The average life Lt under the conditions of the endurance test is experientially estimated (Step 209).

So, in the life calculation part 31, the average life Lf when the engine is actually operating is estimated in accordance with the following formula (5) based on the correspondence relationship between the preset deterioration factor γt under the conditions of the endurance test and the average life Lt corresponding to the deterioration factor γt.

$$Lf(\gamma t/\gamma f) \cdot Lt \quad (5)$$

This determined life Lf is output to the display part 32 as the estimated life of the engine.

In this way, the deterioration factor γf, which is an index indicative of the damage quantity exerted on the engine, is accurately represented by numerics, and the life Lf of the engine can be automatically and accurately estimated without expert skills (Step 210).

Hereafter, the counting result nj of the frequency count part 29 is reset to zero (Step 211), and the same processing in Steps 202–210 is repeatedly executed. In other words, the life Lf of the engine is re-estimated each time the predetermined time τ elapses.

Various variant forms of the above described embodiment are possible.

Among parts constituting the engine, the life of parts which are influenced by thermal load, such as valves, turbos, pistons and manifolds, are not influenced when the engine is operating in an area where the thermal load is small in the first map B.

So, as FIG. 14 shows, the specified area (area where thermal load is small) is set in accordance with the type of parts (parts which are influenced by thermal load) and this specified area is excluded from the detection target and judgment target.

In the present embodiment, it is simply judged that the operation parameters fluctuated if the area Bi of the first map B where the operation parameter values belong change at each sampling time Δt and the type Mj of the locus of the fluctuation is determined, but if the operation parameters stay in a same area for a short period, it may be regarded that the operation parameters did not pass this area, and the type Mj of the locus of the fluctuation may be determined.

Figure 19:
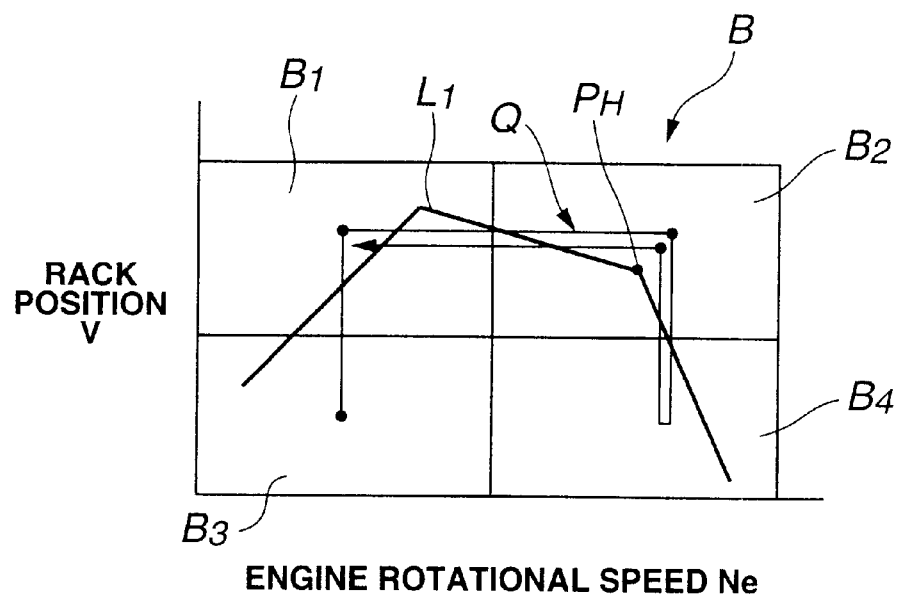
FIG. 19 is a diagram depicting the locus when the operation parameters fluctuate.
Figure 20:
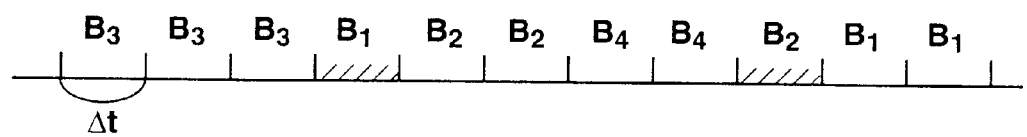
FIG. 20 is a diagram depicting the fluctuation of the first map area where the operation parameters belong to shown for each sampling interval.

For example, as the locus Q in FIG. 19 shows, when the operation parameters actually change as B3→B1→B2→B4→B2→B1, but the change at each sampling time Δt is as shown in FIG. 20, then this is regarded that the operation parameters passed the area where the operation parameters stayed 2Δt or longer (B3, B2, B4, B1 from the beginning), and that the operation parameters did not pass the shaded portion where the operation parameters stayed for Δt or less (B1, B2). In other words, the fluctuation locus Mj is calculated and the second map HS is created regarding that the operation parameters changed as B3→B2→B4→B1.

Now, an embodiment to accurately estimate the life of the engine by representing the accumulation of heat generated by the engine by numerics as the damage quantity will be described.

At first, an embodiment considering "high temperature fatigue" will be described. For this, the concept of the embodiments described in FIG. 1–FIG. 7 can be directly applied.

The life estimation device to implement this is comprised as shown in the functional block diagrams in FIGS. 23(*a*) and 23(*b*).

In the present embodiment, one operation parameter or two or more operation parameters, indicative of the heat generated in the engine required for estimating the life of the engine, are selected from the operation parameters which values change when the engine is operating. In the present embodiment, the exhaust temperature of the engine is selected as the operation parameters indicative of heat.

The exhaust temperature can be directly detected by the temperature sensor 42, as shown in FIG. 23(*a*), or the conventional engine rotational speed sensor 2 and the rack position sensor 3, which have been equipped for controlling the engine, may be used without disposing a new temperature sensor 42, as shown in FIG. 23(*b*), so that the temperature is estimated from the detection values of these sensors.

The rack position is equivalent to the consumption of fuel to be injected into the cylinder of the engine, and substitutes the torque T of the engine. Another operation parameter may be used instead of the rack position V as long as the operation parameter indicates the fuel consumption or the engine torque. The horse power PS of the engine may also be used instead of the rack position V.

Another parameters, instead of the exhaust temperature (engine rotational speed, rack position), may be used only if the operation parameter indicates the heat generated in the engine.

In the present invention, as FIG. 23(*b*) shows, the detection signals of the engine rotational speed sensor 2 for detecting the engine rotational speed Ne (r.p.m.), and the rack position sensor 3 for detecting the rack position V as the voltage value are input to the controller 41 for the engine life estimation, which is comprised with the CPU at the center, later mentioned processing is executed by this controller, and the processing result, which is the estimated life, is displayed on the display part 49 and is disposed at a position visible to the operator. The processing result of the controller may be viewed at a predetermined location outside the construction machine, by connecting the controller inside the construction machine and a personal computer outside the construction machine via a predetermined communication means. In the controller 41, shown in FIG. 23(*a*), the detection signal of the temperature sensor 42 for detecting the exhaust temperature Te of the engine is input.

Figure 25:
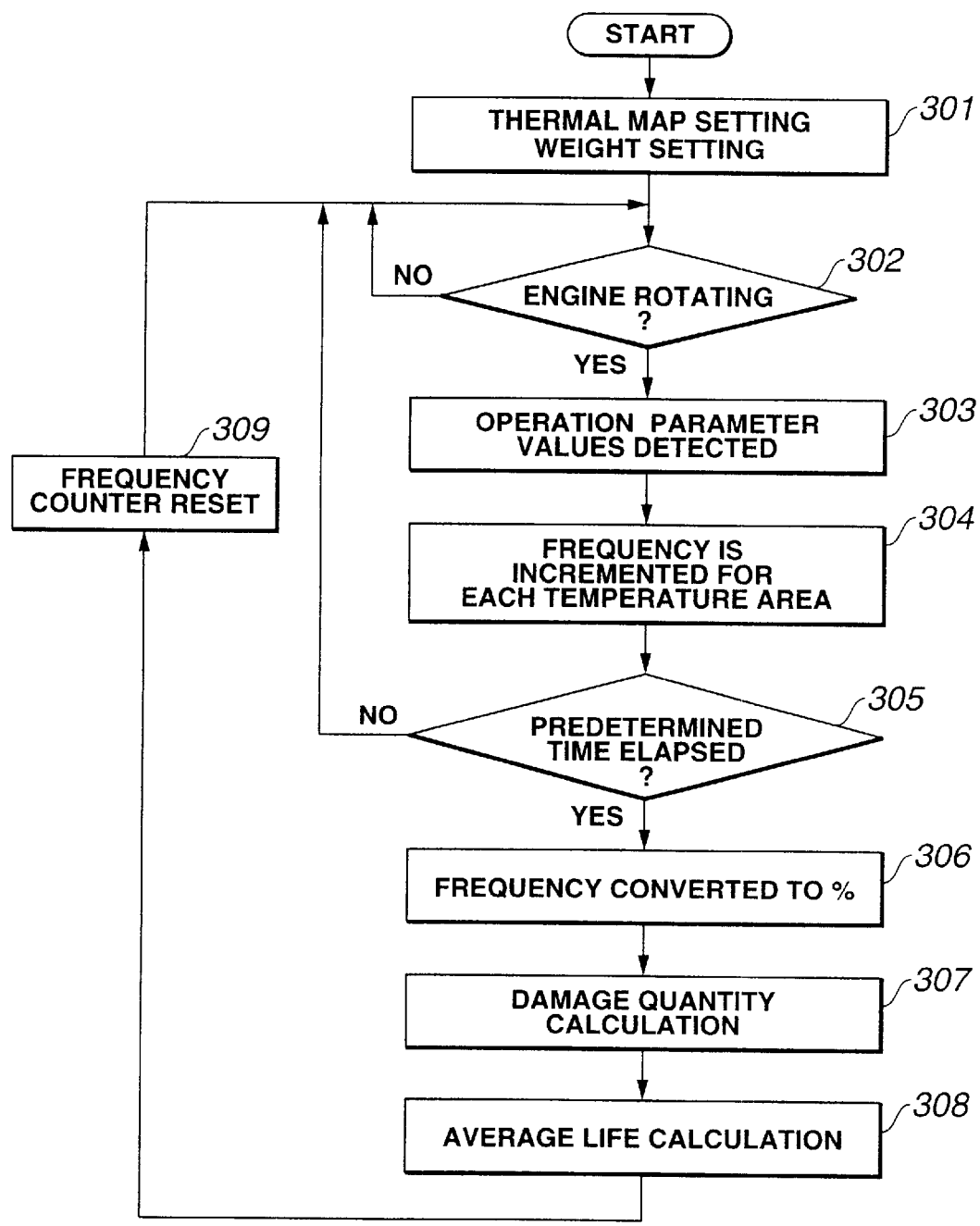
FIG. 25 is a flow chart depicting the processing procedure of the embodiments shown in FIGS. 23($a$) and 23($b$)

FIG. 25 is a flow chart depicting the processing procedure to be executed by the above mentioned controller 41. The content of the processing to be executed by each part of the controller 41 in FIGS. 23(*a*) and 24(*b*) will now be described with reference to the flow chart and the graphs in FIG. 27–FIG. 31 and FIG. 35.

Figure 28:
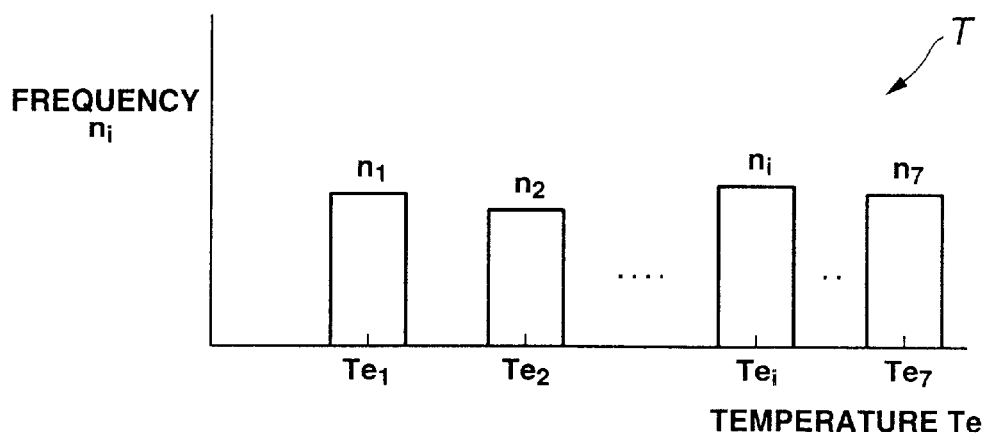
FIG. 28 is a diagram depicting the correspondence of the detection frequency and each area of the thermal map.

As FIG. 28 shows, the thermal map T is set where the abscissa is the engine exhaust temperature Te and the ordinate is the frequency ni. The exhaust temperature Te is divided into seven levels for example, that is, Te1 (0–100° C.), Te2 (101° C.–200° C.), . . . Tei . . . Te7 (601° C.–700° C.), where the respective temperature width is a predetermined width (100° C.).

In this way, the one-dimensional thermal map T, indicative of the distribution of the magnitude of the heat generated in the engine (magnitude of exhaust temperature) is set. The number of divisions of the thermal map T is assumed to be seven, for convenience of explanation, but division less than seven is possible, and division more than seven is also possible.

Figure 30:
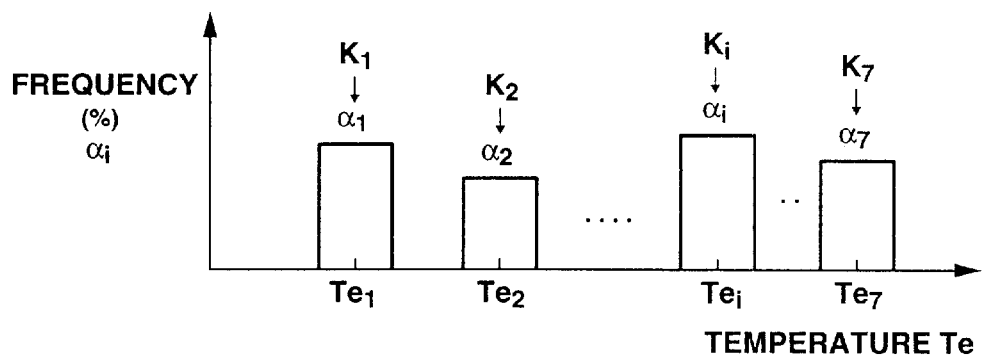
FIG. 30 is a diagram depicting the correspondence of the weight and each area of the thermal map.

Also, as FIG. 30 shows, the weight k in accordance with the magnitude of the heat of the respective area Tei (i=1–7) is set for each area Te1, Te2, . . . Te7 of the thermal map T.

For example, the maximum weight k7 is set in the area at the maximum temperature Te7, and the minimum weight k1 is set in the area at the minimum temperature.

Such a setting of the thermal map T is executed by the thermal map setting part 45a of the controller 41, and the setting of the weight ki is executed by the damage quantity weight setting part 43 (Step 301).

Then, whether the engine is actually operating is judged to collect the operation parameter values Ne and V (or Te) while the engine is operating.

In other words, it is judged whether the engine is rotating based on the output of the engine rotational speed sensor 2 (Step 302).

If it is judged that the engine is rotating, the processing in the following Steps 303–308 is executed.

Then, the operation parameter values Ne and V (or Te) are detected at each predetermined sampling interval Δt, each 10 mmsec., for example, while the engine is operating (Step 303).

Then, based on the calculated temperature Te determined from the detection values of the operation parameters Ne and V, or based on the temperature detection value Te, the number of times of calculation or the number of times of detection ni for the temperature belonging to the respective area Tei is counted until a predetermined time τ elapses, two hours, for example, for each area Te1, Te2, . . . Te7 of the thermal map T. Here, the total number of time of detection during a predetermined time τ (two hours) is assumed to be N (720,000 times).

Here, the engine exhaust temperature is determined by the engine rotational speed and the fuel consumption (rack position of the fuel injection pump).

Figure 27:
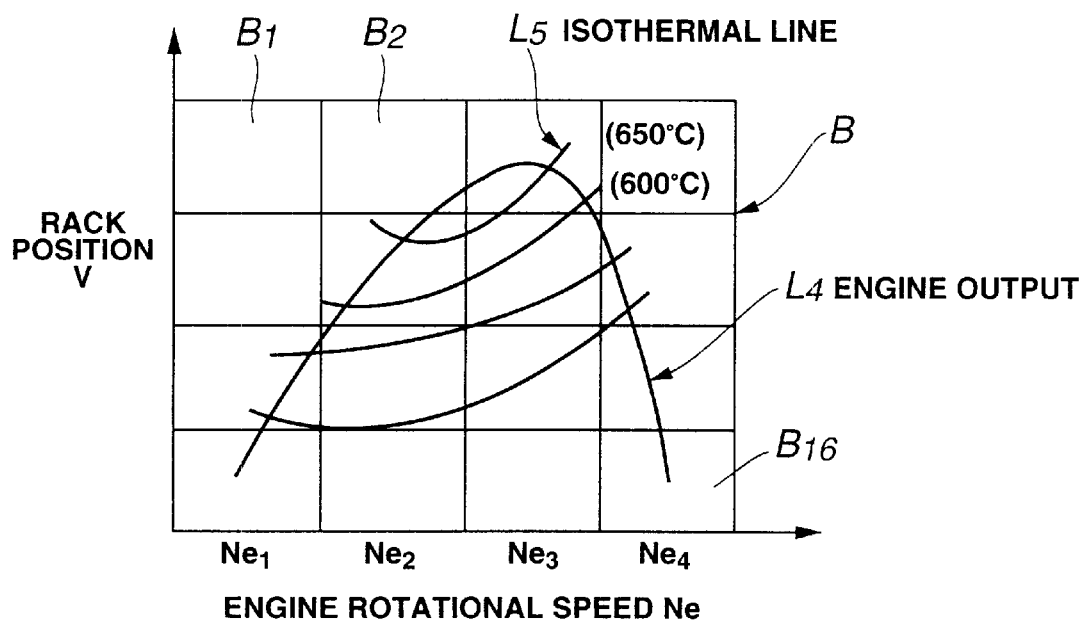
FIG. 27 is a diagram depicting the relationship of the engine relational speed, fuel consumption (rack position) and exhaust temperature.

The graph in FIG. 27 shows the relationship of the engine rotational speed Ne, the rack position V indicative of fuel consumption, and the exhaust temperature Te. L4 indicates the output (horse power) of the engine, and L5 indicates the isothermal line. The isothermal line L5 indicates the maximum temperature (e.g. 650° C. or higher) at the maximum horse power of the engine.

Figure 23A:
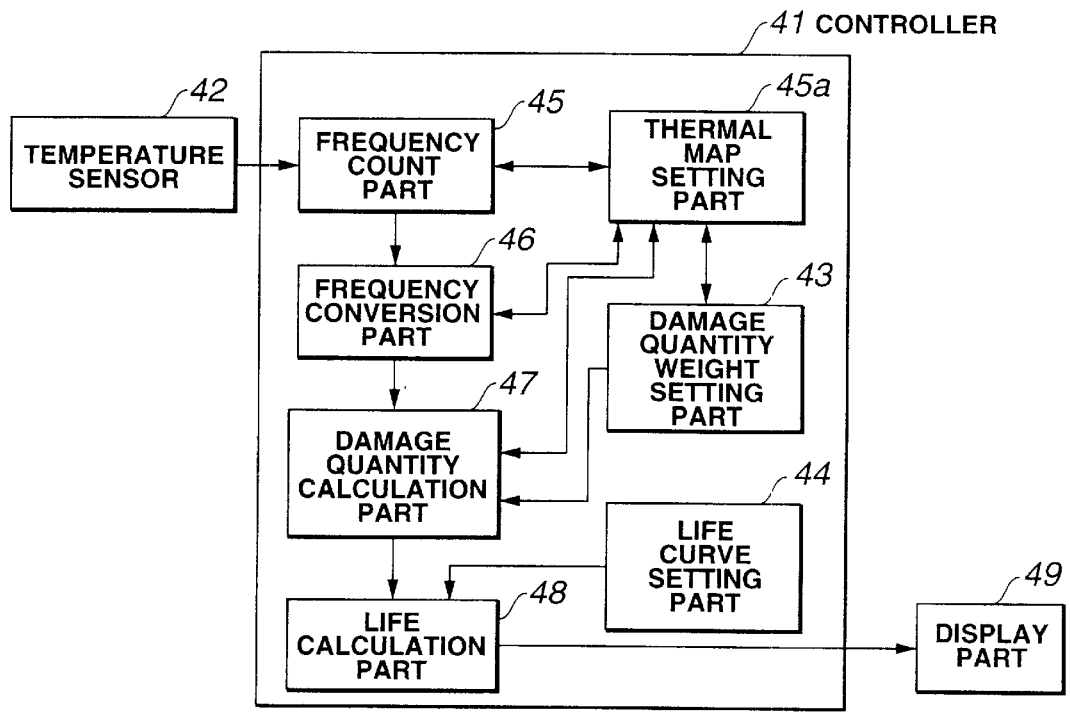
FIGS. 23($a$) and 23($b$) are block diagrams depicting the device configuration of the embodiments of the life estimation device for a machine having a heat source in accordance with the present invention.
Figure 23B:
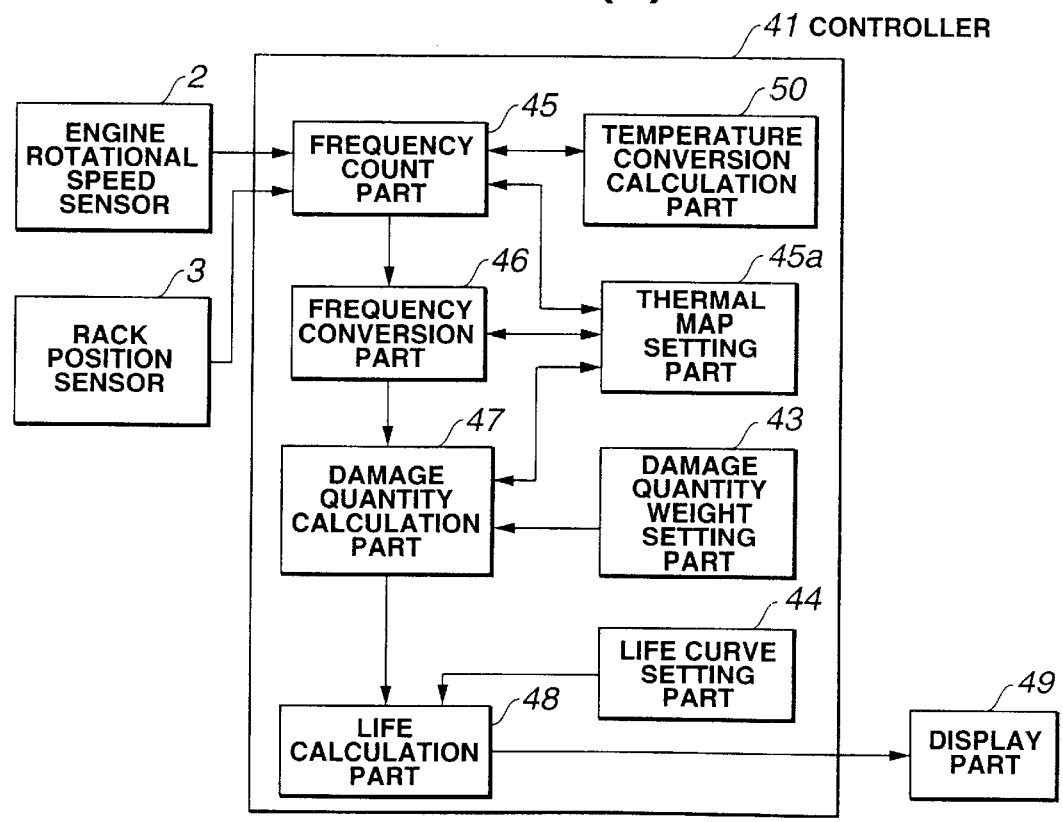

In the temperature conversion operation part 50 in FIG. 23(b), the temperature corresponding to the currently detected engine rotational speed Ne and the rack position V is determined according to the graph shown in FIG. 27, and is output at each sampling interval Δt as the estimated calculated temperature Te.

In the case of the controller 41 in FIG. 23(a), where the detected temperature Te of the temperature sensor 42 is directly input, the above temperature conversion operation part 50 is unnecessary.

Since the temperature Te is specified at each predetermined interval Δt in this way, which temperature area of Te1–Te7 in FIG. 28 the current temperature belongs is specified at each predetermined interval Δt. When the area Tei, where the current temperature Te belongs, is specified at each predetermined interval Δt in this way, the detection frequency ni for the area Tei is incremented sequentially by +1. For example, if the exhaust temperature Te is 150° C. at time t, then +1 is added to the detection frequency n2 of the corresponding area Te2.

It is also possible to include, not all of the detection data Te as effective in the frequency n, the detection data Te as effective in the frequency n only when the detection data Te belonging to the same temperature area is continuously detected (same temperature for a predetermined time or longer).

Figure 31:
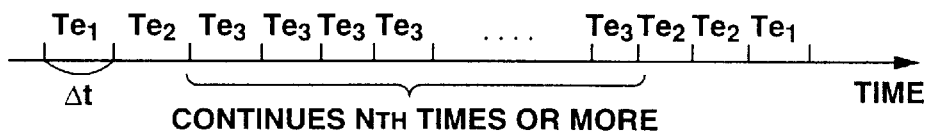
FIG. 31 is a diagram depicting the acquisition of the effective data from the detected data.

For example, when the detection data Te shown in FIG. 31 is detected at each Δt, the data Te1 and Te2, which is detected continuously only for the number of times less than the predetermined threshold value Nth times (e.g. 100 times, 10 sec.), are excluded, and the data Te3, detected continuously for Nth times or more, is regarded as effected and included in the frequency n3.

In this way, the detection frequency ni is counted for each area Tei, as shown in FIG. 28, and the detection frequency ni is integrated until the predetermined time τ elapses (Step 304).

In other words, it is judged whether the predetermined time τ (e.g. two hours) has elapsed since the start of counting (Step 305), and if the above predetermined time τ has not elapsed, the above processing to count and integrate the detection frequency ni is repeatedly executed as long as the engine is rotating (Steps 302–304). If the above predetermined time τ has elapsed, on the other hand, processing to count the detection frequency ni is ended here.

The above counting of the frequency ni is executed by the frequency count part 45.

Figure 29:
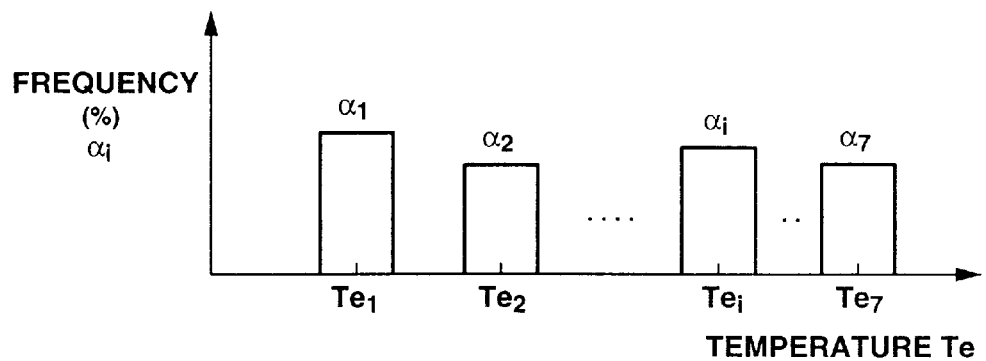
FIG. 29 is a diagram depicting the correspondence of the detection frequency converted to % and each area of the thermal map.

Then, the frequency conversion part 46 divides the detection frequency ni until the predetermined time τ elapses by, the total number of times of the detection N, as shown in FIG. 29, so as to convert the detection frequency ni to %.

The frequency αi converted to % in this way, that is, αi (ni/N)·100 (%), indicates the ratio of the time that belonged to the temperature area Tei within the predetermined time τ.

For example, if the frequency α7 converted to % in the area Te7 is 30%, this means that the temperature Te (operation parameters Ne, V), (the temperature was between 601° C. and 700° C.), belonging to the area α7 was detected during 30% (0.6 hours) of the predetermined time τ (two hours).

Converting the detection frequency ni to % is to decrease the capacity of the memory. If the storage capacity of the memory is big enough, the detection frequency ni may be directly used for subsequent calculations, instead of the frequency αi converted to %. Also, the detection time (ni/N)·τ for each area Tei may be used for subsequent calculations instead of αi, since critical here is to determine the detected time for each area Tei (Step 306).

Then, the damage quantity calculation part 47 executes weighting αi·ki for the above detection frequency αi converted to % in accordance with the weight ki set by the damage quantity weight setting part 43, as shown in FIG. 30, so that the high temperature fatigue damage quantity, which is the index to represent actual damage quantity (damage quantity by "high temperature fatigue") exerted on the engine until a predetermined time τ elapses, is calculated as follows.

$$\varepsilon = \sum_i \alpha i \cdot k i \qquad (7)$$

As the above formula (7) shows, the high temperature fatigue damage quantity ε indicates a greater value as the time of operating at the high heat area Tei (e.g. Te7) in the thermal map T increases (Stop 307).

Figure 35:
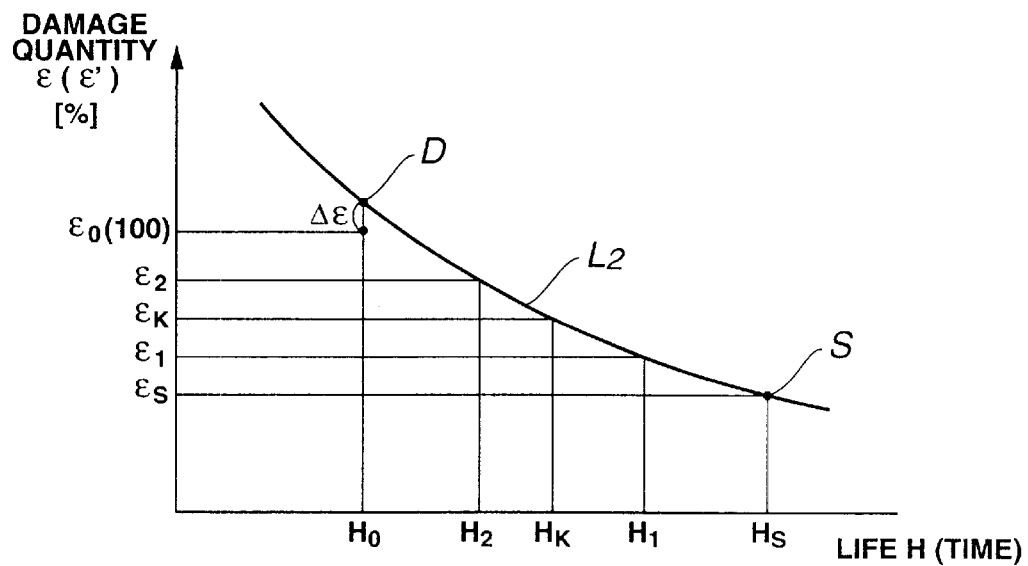
FIG. 35 is a diagram depicting the correspondence relationship between the damage quantity caused by heat and the life of the machine.

In the development of the engine, the endurance test and parts inspection after testing are executed in advance, and the correspondence relationship L2 between the magnitude of the damage quantity ε and the length H of the average life of the engine is preset, as shown in FIG. 35.

In other words, 100% high temperature fatigue damage quantity ε0 corresponds to the time H0 when a predetermined endurance test was executed. And a predetermined margin Δε is added to the high temperature fatigue damage quantity ε0, and the point D is plotted. And, from the inspection on the abrasion and damage of the parts after the endurance test, the damage quantity εs under the general operation conditions and the life Hs under the general operation conditions, are experientially determined, and the point S corresponding to this is plotted.

And, as the curve connecting the point D and the point S, the correspondence relationship L2 between the magnitude of the high temperature fatigue damage quantity ε and the length H of the average life of the engine is determined. This average life curve L2 is the average for the engine in general, and actually has a margin because of dispersion during manufacturing of the respective engine. This average life curve L2 differs depending on the model of the engine and the type of parts constituting the engine.

The above average life curve L2 is preset in the life curve setting part 44.

If the high temperature fatigue damage quantity ε is calculated to be the value ε1 by the above formula (7), the life calculation part 48 determines the life H1 corresponding to the high temperature fatigue damage quantity є1 from the above preset correspondence relationship L2, and the determined life H1 is output to the display part 49 as the estimated life of the engine. If the high temperature fatigue damage quantity is є2, the estimated life H2 corresponding to this is output to the display part 49.

In this way, the high temperature fatigue damage quantities є1 and є2 exerted on the engine are accurately represented by numerics, and the lives H1 and H2 of the engine can be automatically and accurately estimated without expert skills (Step 308).

Then, the counting result ni of the frequency count part 45 is reset to zero (Step 309), and the same processing as in Steps 302–308 is repeatedly executed. In other words, the life H of the engine is re-estimated each time a predetermined time τ elapses, and the estimation result for the life H of the engine is accurately corrected even if the operation conditions of the engine change.

Also, the residual life HLf from now until the end of the life H may be determined as follows and output to the display part 49.

Now, it is assumed that the high temperature fatigue damage quantity determined at each predetermined time τ is єk (k=1, 2, . . . ), and the estimated life Hk corresponding to this is determined (see FIG. 35). Then, the residual life HLf is determined by the following formula (8), where SMR is the current cumulative operation time (measured value of the operation service meter).

$$HLf=Hk-SMR \quad (8)$$

The residual life H may be determined by the following formula.

$$HLf(t+\tau)=HLf(t)-\tau(Hs/Hk) \quad (9)$$

The initial value of the residual life HLf, however, is Hs (life under general operation conditions), and the residual life HLf is updated sequentially each time τ time elapses in accordance with the formula (9).

According to the formula (9), actual operation time τ subtracted from the current life HLf (t) results in the residual life HLf if the engine is used under the general operation conditions, but, as the damage quantity due to heat increases (Hk decreases), time becomes substantially longer than the actual operation time τ, that is, τ(Hs/Hk)(>τ) is subtracted from the current life HLf (t), and the residual life HLf becomes shorter than the case when operating under general operation conditions.

In the present embodiment, it is assumed that the life of the engine itself is estimated, but the life may be estimated for each type of parts constituting the engine.

For example, parts damaged by high temperature fatigue are cylinder liners, cylinder heads and valves. The life only for these specified parts may be estimated.

In this case, the life curve shown in FIG. 35 is predetermined for each type of parts constituting the engine. Also, the value of the weight ki according to the magnitude of the heat shown in FIG. 30 may differ depending on the type of parts constituting the engine. And, as described in FIG. 31, processing to regard detection data which is not continuous as invalid may be executed only for the specified parts.

The present embodiment is based on the assumption that a one-dimensional map of the temperature is used as the thermal map T, but a two- or more dimensional map may be used. For example, as FIG. 27 shows, the two-dimensional map B indicative of the magnitude of the engine rotational speed Ne and the rack position V may be used as the thermal map, where the magnitude of the heat (magnitude of temperature) corresponds with each block, B1–B16, and the frequency n is counted for each block.

The target of the life estimation is not limited to the engine itself or parts constituting the engine. Any composing element where heat generated by the engine is applied can be the target of the above mentioned life estimation. For example, the life of a power train where power from the engine is transferred or parts constituting the power train can be estimated.

The present invention is not limited to a machine having an engine. The present invention can be applied to any machine having a heat source and damaged by heat, which life is influenced by the damage.

In the above embodiment, the damage quantity exerted on the engine is determined directly from the heat (temperature) value, but now an embodiment to determine the damage quantity exerted on the engine considering the fluctuation quantity of the heat (temperature), that is, an embodiment considering the "thermal fatigue", will be described. For this, the concepts of the embodiments described with FIG. 8–FIG. 22 can almost be directly applied.

Figure 24A:
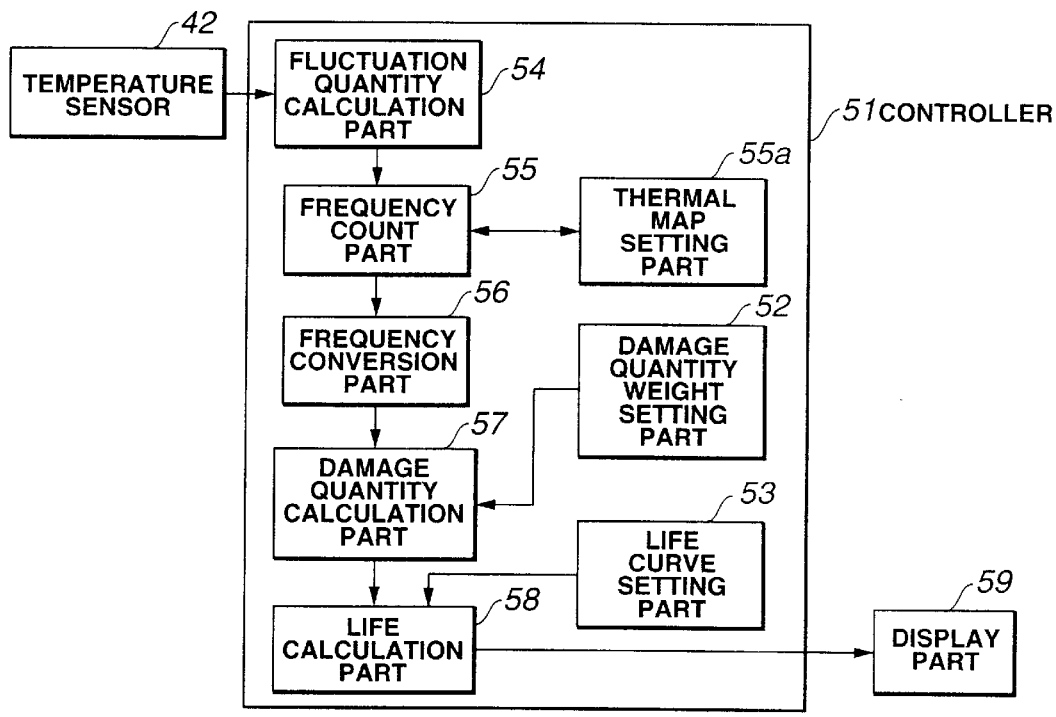
FIGS. 24($a$) and 24($b$) are block diagrams depicting the device configuration of the embodiments of the life estimation device for the machine having a heat source in accordance with the present invention.
Figure 24B:
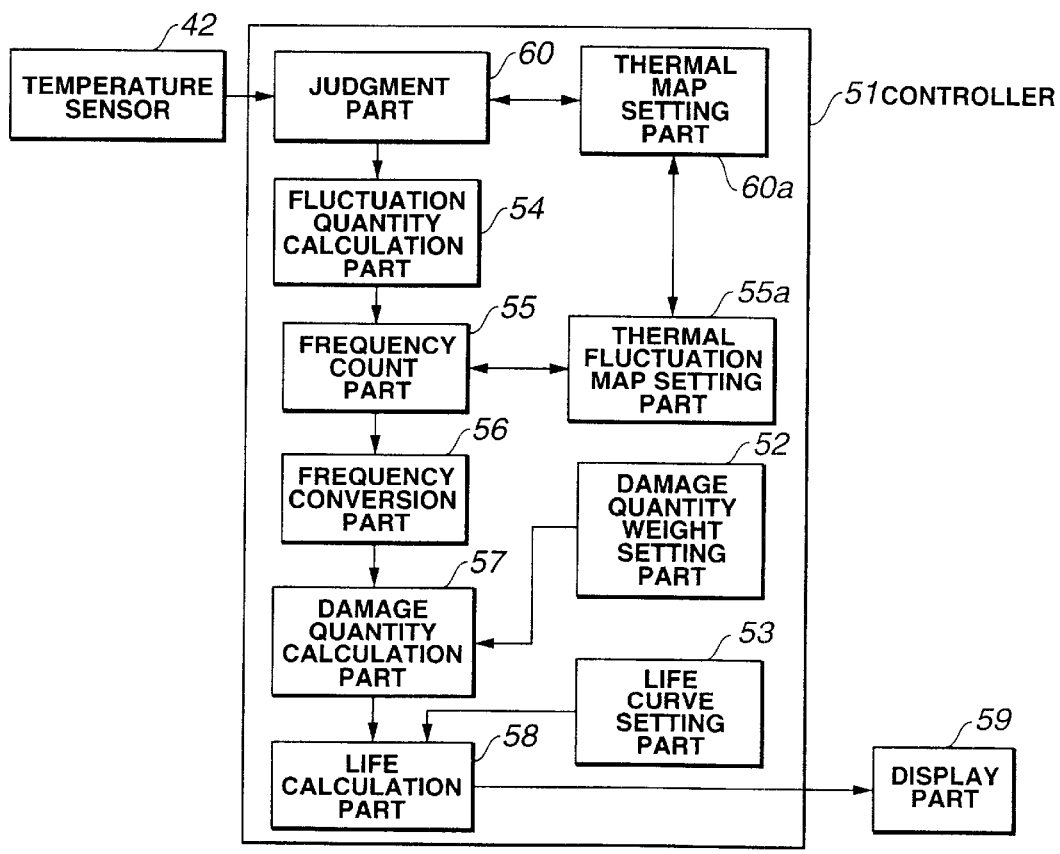

The life estimation device to implement this is comprised as shown in the functional block diagrams in FIGS. 24(a) and 24(b).

In the present embodiment, one operation parameter or two or more operation parameters indicative of the heat generated in the engine, required for estimating the life of the engine, are selected from the operation parameters which values change when the engine is operating. In the present embodiment, the exhaust temperature of the engine is selected as the operation parameter indicative of heat.

It is assumed that the exhaust temperature is directly detected by the temperature sensor 42, but, as explained with FIG. 23(b), the conventional engine rotational speed sensor 2 and the rack position sensor 3, which have been equipped for controlling the engine, may be used without disposing a new temperature sensor 42, so that the temperature is estimated from the detection values of these sensors.

Another parameter, instead of the exhaust temperature (engine rotational speed, rack position), may be used only if the operation parameter indicates the heat generated in the engine.

In the present embodiment, as FIG. 24(b) shows, the detection signal of the temperature sensor 42 for detecting the exhaust temperature Te is input to the controller 51 for engine life estimation, which is configured with the CPU at the center, later mentioned processing is executed by this controller, and the processing result, which is the estimated life, is displayed in the display part 59 disposed at the position visible to the operator. The processing result of the controller may be viewed at a predetermined location outside the construction machine by connecting the controller inside the construction machine and a personal computer outside the construction machine via a predetermined communication means.

Figure 26:
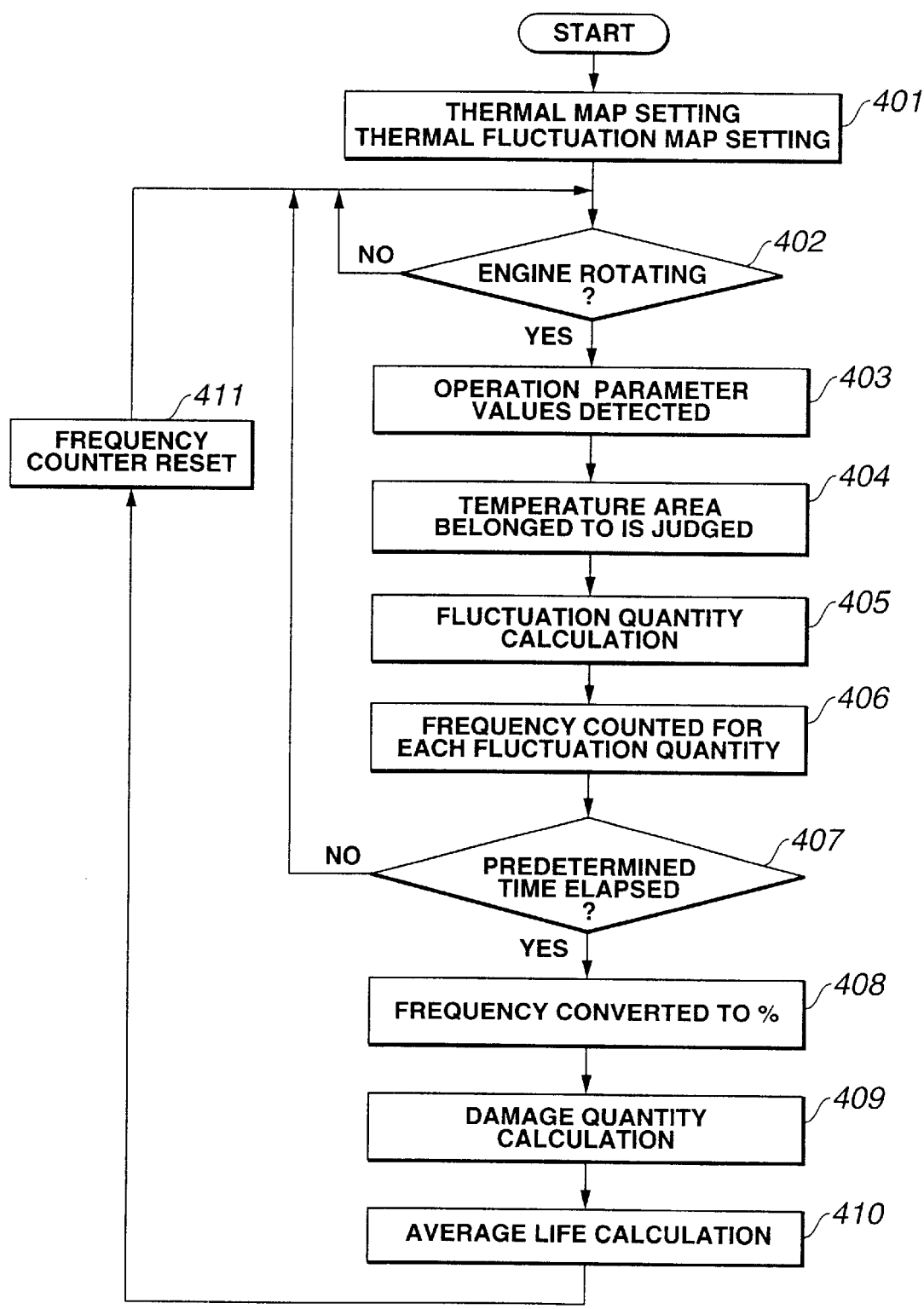
FIG. 26 is a flow chart depicting the processing procedure of the embodiments shown in FIGS. 24($a$) and 24($b$)

FIG. 26 is a flow chart depicting the processing procedure to be executed by the above mentioned controller 51. The content of the processing to be executed by each part of the controller 51 in FIGS. 24(a) and 24(b) will now be described with reference to this flow chart and the graphs in FIG. 28 and FIG. 31–FIG. 35.

As FIG. 28 shows, the thermal map T where the abscissa is the engine exhaust temperature Te and the ordinate is the frequency ni is set. The exhaust temperature Te is divided into seven levels for example, that is, Te1 (0–100° C.), Te2 (101° C.–200° C.), . . . Tei . . . Te7 (601° C.–700° C.), where the respective temperature width is a predetermined width (100° C.).

In this way, the one-dimensional thermal map T, indicative of the distribution of the magnitude of the heat generated in the engine (magnitude of exhaust temperature), is set. The number of divisions of the thermal map T is assumed to be seven for convenience of explanation, but division less than seven is possible and division more than seven is also possible.

Such a setting of the thermal map T is executed by the thermal map setting part 60a of the controller 51.

Here, $\Delta Te$ is set as the unit fluctuation width of the temperature Te. This unit fluctuation width corresponds to the width of the temperature area Tei (100° C.) of the thermal map T.

If the exhaust temperature Te fluctuated 100° C., for example, this is regarded that the temperature Te fluctuated at the unit fluctuation width $\Delta Te$.

Figure 32:
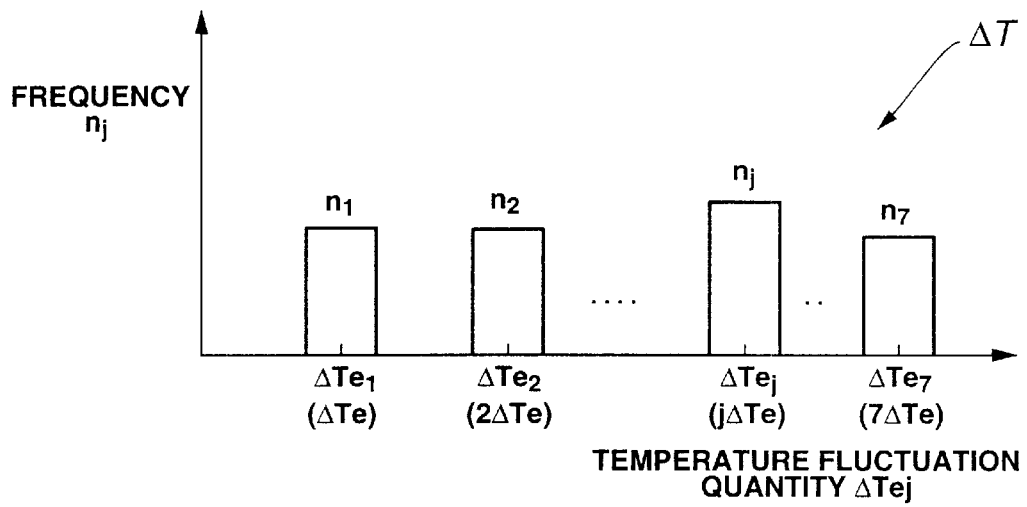
FIG. 32 is a diagram depicting the correspondence of the detection frequency and each area of the thermal fluctuation map.

So, as FIG. 32 shows, the thermal fluctuation map $\Delta T$, indicative of the distribution of the magnitude of the fluctuation quantity $\Delta Tej$ of the heat (temperature) per unit time, is set.

In other words, in the abscissa of the thermal fluctuation map $\Delta T$, the magnitude of the temperature fluctuation quantity $\Delta Tej$ (j=1, 2, 3, 4, 5, 6, 7), that is, $\Delta Te1$ (unit fluctuation width $\Delta Te$), $\Delta Te2$ (2$\Delta Te$, which is two times the unit fluctuation width $\Delta Te$), ... $\Delta Te7$ (7$\Delta Te$, which is seven times the unit fluctuation width $\Delta Te$), are plotted in the abscissa.

Such a setting of the thermal fluctuation map $\Delta T$ is executed by the thermal fluctuation map setting section 55a of the controller 51 (Step 401).

Then, whether the engine is actually operating is judged to collect the operation parameter value Te while the engine is operating.

In other words, it is judged whether the engine is rotating based on the output of the engine rotational speed sensor 2 (Step 402).

If it is judged that the engine is rotating, the processing in the following Steps 403–410 is executed.

Then, the operation parameter value Te is detected at each predetermined sampling interval $\Delta t$, each 10 mmsec., for example, while the engine is operating (Step 403).

Then, which area Tei of the thermal map T the operation parameter value Te, which is detected at each predetermined interval $\Delta t$, belongs to, is judged at each predetermined interval $\Delta t$.

In this way, which temperature area Te1–Te7, the operation parameter value Te belongs to, is specified at each predetermined interval $\Delta t$, and which area Tei of the thermal map T the operation parameter value Te belongs to, is judged. Such judgment processing is executed by the judgment part 60 of the controller 51 (Step 404).

Then, in the fluctuation quantity calculation part 54 of the controller 51, based on the areas judged sequentially by the judgment part 60, the fluctuation width between the areas which fluctuated per unit time, that is, $\Delta Te$, 2$\Delta Te$, ... 7$\Delta Te$, is calculated as the fluctuation quantity of the operation parameter Te per unit time. The unit time is set, for example, to the above mentioned predetermined interval (sampling interval) $\Delta t$.

For example, if the temperature Te fluctuated for 3$\Delta Te$, which is three times the unit fluctuation width $\Delta Te$, from the area Te1 to area Te3 during the unit time $\Delta t$, then the fluctuation quantity of the temperature is calculated as 3$\Delta Te$ (Step 405).

Then, in the frequency count part 55, as FIG. 32 shows, the frequency nj of calculating the frequency quantity in this way, is counted for each magnitude of the fluctuation quantity, that is, $\Delta Te1$, $\Delta Te2$, ... $\Delta Te7$, of the thermal fluctuation map $\Delta T$, and is integrated until the predetermined time $\tau$ elapses. For example, if the level of the temperature at time $\tau$ is Te2, and the level of the temperature at the time which passed the sampling interval $\Delta T$, that is t+$\Delta t$, is Te1, then +1 is added to the detection frequency ni of $\Delta Te1$ of the thermal fluctuation map $\Delta T$ for the temperature fluctuation quantity per unit time $\Delta t$, since the unit fluctuation width is $\Delta Te$.

The predetermined time $\tau$ is two hours, for example, and the total frequency (including the frequency to calculate the fluctuation quantity 0) during the two hours is assumed to be N (720,000 times) (Step 406).

Then, it is judged whether the predetermined time $\tau$ (e.g. two hours) has elapsed since the start of counting (Step 407), and if the above mentioned predetermined time $\tau$ has not elapsed, the above processing to count and integrate the frequency nj is repeatedly executed as long as the engine is rotating (Steps 402–406). If the above predetermined time $\tau$ has elapsed, on the other hand, processing to count the frequency nj is ended here.

The above counting of the frequency nj is executed by the frequency count part 55.

The thermal fluctuation map $\Delta T$, shown in FIG. 32, can be created by normalizing the entire data, which is obtained by sampling the operation parameter Te at the predetermined interval $\Delta t$, by the known "Rain flow method".

In the above embodiment, the thermal map T is set, and the fluctuation quantity $\Delta Tej$ of the operation parameter per unit time is determined, assuming that the operation parameter Ne detected sequentially at each predetermined interval $\Delta t$ becomes the central value (or representative value) of the area Tei of the thermal map T, but the sampling data Te may be directly normalized by the "Rain flow method", to determine the fluctuation quantity $\Delta Tej$ of the operation parameter per unit time, without converting the operation parameter value Te detected sequentially at each predetermined interval $\Delta t$ to the central value (or representative value) of the area Tei of the map T, so as to create the thermal fluctuation map $\Delta T$.

In this case, the thermal map setting part 60a and the judgment part 60 in the controller 51 can be omitted, as shown in FIG. 24(a), and the thermal map setting processing in Step 401 and the judgment processing in Step 404 are unnecessary.

It is also possible that all the detection data Te are not processed by the "Rain flow method" regarding the data as effective, but the detection data Te is regarded as effective and is processed by the "Rain flow method" only when the data in the same temperature area is continuously detected (same temperature for the predetermined time or longer).

For example, if the detection data Te shown in FIG. 31 is detected at each $\Delta t$, the data Te1 and Te2, which were continuously detected for a number of times less than the predetermined threshold value Nth times (e.g. 100 times: 10 sec.), are excluded, and the data Te3, which was continuously detected for Nth time or more, is regarded as effective and becomes the target of processing by the "Rain flow method".

In the present embodiment, the magnitude of the unit fluctuation quantity of the thermal fluctuation map $\Delta T$ is set to $\Delta Te$ (100° C.), which is the same width as the width of the area Tei in the thermal map T, but this is not restricted and the magnitude of the unit fluctuation quantity of the thermal fluctuation map $\Delta T$ can be set to any magnitude.

Figure 33:
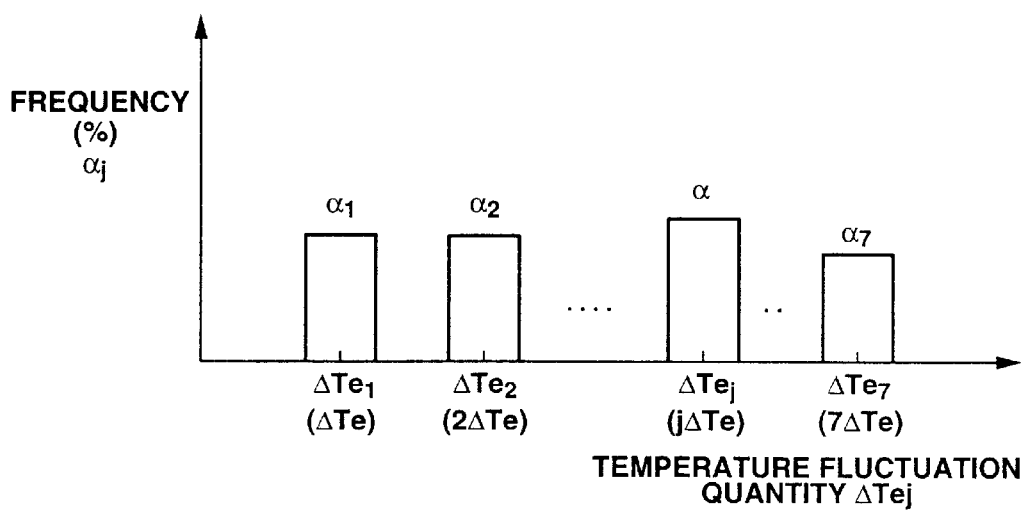
FIG. 33 is a diagram depicting the correspondence of the detection frequency converted to % and each area of the thermal fluctuation map.

Then, the frequency conversion part 56 divides the frequency nj until the predetermined time $\tau$ elapses by the total frequency N, as shown in FIG. 33, so as to convert the frequency nj to %.

The frequency αj converted to % in this way, that is, αj=(nj/N)·100 (%), indicates the ratio of the time when the fluctuation quantity is ΔTej to the predetermined time τ.

For example, if the frequency Δ1 converted to % of the thermal fluctuation quantity ΔTe1 is 25%, this means that the temperature fluctuated with the magnitude ΔTe1 during 25% (0.5 hours) of the predetermined time τ (two hours).

Converting the frequency to % is to decrease the capacity of the memory. If the storage capacity of the memory is big enough, the detection frequency nj may be directly used for subsequent calculations, instead of the frequency αj converted to % (Step 408).

Figure 34:
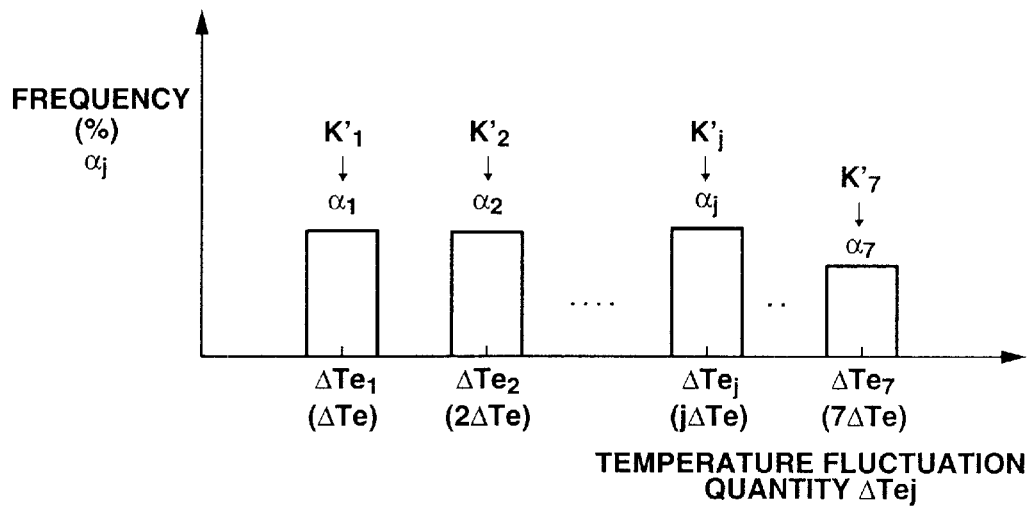
FIG. 34 is a diagram depicting the correspondence of the weight and each area of the thermal fluctuation map.

Then, the damage quantity calculation part 57, as shown in FIG. 34, executes weighting αj·k'j for the above frequency αj converted to % in accordance with the weight k'j set by the damage quantity setting part 52, so that the thermal fatigue damage quantity, which is the index to represent the actual damage quantity (damage quantity by "thermal fatigue") exerted on the engine until the predetermined time τ elapses, is calculated as follows.

$$\varepsilon' = \sum_j \alpha j \cdot k'j \qquad (10)$$

As the above formula (10) shows, the thermal fatigue damage quantity ε' indicates a greater value as the time of operating in the area ΔTej with high thermal fluctuation (e.g. ΔTe7) in the thermal fluctuation map ΔT increases (Step 409).

In the development of the engine, an endurance test and parts inspection after testing are executed in advance, and the correspondence relationship L2 between the magnitude of the damage quantity ε' and the length H of the average life of the engine is preset, as shown in FIG. 35.

In other words, 100% thermal fatigue damage quantity ε'0 corresponds to the time H0 when the predetermined endurance test was executed. And, the predetermined margin Δε' is added to the thermal fatigue damage quantity ε'0, and the point D is plotted. And, from the inspections on abrasion and damage of the parts after the endurance test, the damage quantity ε's under the general operation conditions, and the life Hs under the general operation conditions, are experientially determined, and the point S corresponding to this is plotted.

And, as the curve connecting the point D and the point S, the correspondence relationship L2 between the magnitude of the thermal fatigue damage quantity ε' and the length H of the average life of the engine is determined. This average life curve L2 is the average for the engine in general, and actually has a margin because of dispersion during the manufacturing of the respective engine. This average life curve L2 differs depending on the model of the engine and type of parts constituting the engine.

The above average life curve L2 is preset in the life curve setting part 53.

If the actual thermal fatigue damage quantity ε' is calculated to be value by the above formula (10), the life calculation part 58 determines the life H1 corresponding to this thermal fatigue damage quantity ε'1 from the above preset correspondence relationship L2, and the determined life H1 is output to the display part 59 as the estimated life of the engine. If the thermal fatigue damage quantity is ε'2, the estimated life H2 corresponding to this is output to the display part 59.

In this way, the thermal fatigue damage quantities ε'1 and ε'2 exerted on the engine are accurately represented by numerics, and the lives H1 and H2 of the engine can be automatically and accurately estimated without expert skills (Step 410).

Then, the counting result nj of the frequency count part 55 is reset to zero (Step 411), and the same processing in the Steps 402–410 is repeatedly executed. In other words, the life H of the engine is re-estimated each time the predetermined time τ elapses, and the estimation result for the life H of the engine is accurately corrected even if the operation conditions of the engine change.

Also, the residual life HLf from now to the end of the life H may be determined by the above formulas (8) to (10), and output to the display part 59.

In the present embodiment, it is assumed that the life of the engine itself is estimated, but the life may be estimated for each type of parts constituting the engine.

For example, parts damaged by thermal fatigue are pistons and parts around pistons (e.g. piston rings). Life only for these specified parts may be estimated.

In this case, the life curve shown in FIG. 35 is predetermined for each type of parts constituting the engine. Also, the value of the weight k'j according to the magnitude of the thermal fluctuation shown in FIG. 30 may differ depending on the type of parts constituting the engine. And, as described in FIG. 31, processing to regard the detection data which is not continuous as invalid, may be executed only for the specified parts.

The present embodiment is based on the assumption that a one-dimensional map of the temperature is used as the thermal map T, but a two- or more dimensional map may be used. For example, as FIG. 27 shows, the two-dimensional map B indicative of the distribution of the magnitude of the engine rotational speed Ne and the rack position V may be used as the thermal map, where the magnitude of the heat (magnitude of temperature) corresponds with each block B1–B16.

The target of the life estimation is not limited to the engine itself or to parts constituting the engine. Any composing element where the heat generated by the engine is applied can be the target of the above mentioned life estimation. For example, the life of a power train where the power by the engine is transferred or parts constituting the power train can be estimated.

The present invention is not limited to a machine having an engine. The present invention can be applied to any machine having a heat source and damaged by the heat, which life is influenced by the damage.

According to the above described embodiments, the time of overhaul of a machine, such as an engine, can be accurately estimated, so such an accident as major damage to an engine can be prevented by maintenance at an appropriate time. Since the time of overhaul can be accurately estimated, maintenance planning is possible, where accurate production planning, such as vehicle arrangement planning, is possible, parts required for overhaul can be prepared at the necessary time, and management of mechanics becomes easier.

INDUSTRIAL APPLICABILITY

The life estimation target of the present invention is not limited to the engine itself or parts constituting the engine. Any composing element where the heat generated by the engine is applied can be the target of the above mentioned life estimation. For example, the life of a power train where power from the engine is transferred or parts constituting the power train can be estimated. The life estimation target is also not limited to a machine having an engine. The present invention can be applied to any machine having a heat source, which is damaged by the heat and which life is influenced by the damage.

What is claimed is:

1. A life estimation device for an engine which collects data of operation parameters which values change when the engine is operating and estimates a life of the engine based on the data of the operation parameters, comprising:

load map setting means for selecting one operation parameter or two or more operation parameters indicative of a load exerted on the engine, and dividing a value of the one operation parameter or combinations of values of the two or more operation parameters into a plurality of levels, so as to set a one-dimensional or two- or more dimensional load map for indicating a distribution of magnitude of the load exerted on the engine;

operation parameter detection means for detecting the values of the operation parameters;

time integration means, by detecting, the operation parameters by the operation parameter detection means until a predetermined time elapses, for integrating a time during which operation parameter values belonging to the respective level are detected for each level of the load map;

weight setting means for setting a weight in accordance with the load of the respective level for each level of the load map;

damage quantity calculation means for determining the weighted integration time for each level of the load map by weighting the integration time integrated by the time integration means in accordance with the weight set by the weight setting means, and calculating an actual damage quantity exerted on the engine until the predetermined time elapses based on the integration time weighted for each level of the load map;

correspondence relationship setting means for presetting a correspondence relationship between a magnitude of the damage quantity and a length of life by pre-operating the engine; and life estimation means for determining a life corresponding to the actual damage quantity calculated by the damage quantity calculation means from the correspondence relationship preset by the correspondence relationship setting means, and outputting the determined life as the estimated life of the engine.

2. The life estimation device for an engine according to claim 1, characterized in that the two operation parameters indicative of the load exerted on the engine are an engine rotational speed and a torque or a horse power of the engine, and the load map setting means sets a two-dimensional map of the engine rotational speed and the torque or the horse power of the engine.

3. The life estimation device for an engine according to claim 1, characterized in that the operation parameter detection means detects the operation parameter values at a predetermined interval, and the time integration means counts the number of times when the operation parameter values belonging to the respective level were detected for each level of the load map until the predetermined time elapses, so as to integrate the time when the operation parameter values belonging to the respective level for each level of the load map.

4. The life estimation device for an engine according to claim 1, characterized in that the integration time integrated by the time integration means is reset each time the predetermined time elapses, so as to re-estimate the life of the engine each time the predetermined time elapses.

5. A life estimation device for an engine which collects data of operation parameters which values change when the engine is operating, and estimates a life of the engine based on the data of the operation parameters, comprising:

operation parameter detection means for selecting one operation parameter or two or more operation parameters indicative of a load exerted on the engine or an engine rotational speed and detecting values of the selected operation parameters at each predetermined interval;

fluctuation quantity calculation means for calculating a fluctuation quantity of the operation parameters per unit time based on the values of the operation parameters detected by the operation parameter detection means at each predetermined interval;

fluctuation quantity map setting means for setting a fluctuation quantity map indicative of a distribution of magnitude of the fluctuation quantity of the operation parameters per the unit time;

frequency measurement means for measuring a frequency of calculating the respective magnitude of the fluctuation quantity until a predetermined time elapses for each magnitude of the fluctuation quantity of the fluctuation quantity map;

weight setting means for setting a weight for each magnitude of the fluctuation quantity of the fluctuation quantity map;

damage quantity calculation means for determining the weighted frequency for each magnitude of the fluctuation quantity of the fluctuation quantity map by weighting the frequency measured by the frequency measurement means in accordance with the weight set by the weight setting means, and calculating an actual damage quantity exerted on the engine until the predetermined time elapses based on the weighted frequency for each magnitude of the fluctuation quantity of the fluctuation quantity map;

correspondence relationship setting means for presetting a correspondence relationship between the magnitude of the damage quantity and a length of life by pre-operating the engine; and life estimation means for determining the life corresponding to the actual damage quantity calculated by the damage quantity calculation means from the correspondence relationship preset by the correspondence relationship setting means, and outputting the determined life as the estimated life of the engine.

6. A life estimation device for an engine which collects data of operation parameters which values change when the engine is operating, and estimates a life of the engine based on the data of the operation parameters; comprising:

a first map setting means for setting one operation parameter or two or more operation parameters indicative of a load exerted on the engine or an engine rotational speed and setting a one-dimensional or two- or more dimensional first map indicative of a distribution of magnitude of the load exerted on the engine or a magnitude of the rotational speed by dividing a value of the one operation parameter or combinations of values of two or more operation parameters into a plurality of levels;

operation parameter detection means for detecting the operation parameter values at each predetermined interval;

judgment means where which level of the first map the operation parameter values, which are detected by the operation parameter detection means at each predetermined interval, belong to, is judged at the predetermined interval;

fluctuation quantity calculation means where based on the level judged sequentially by the judgment means, the fluctuation width between the levels which fluctuated per unit time is calculated as the fluctuation quantity of the operation parameters per unit time;

a second map setting means for setting a second map indicative of the distribution of magnitude of the fluctuation quantity of the operation parameters per the unit time;

frequency measurement means for measuring a frequency of calculating the respective magnitude of the fluctuation quantity until a predetermined time elapses for each magnitude of the fluctuation quantity of the second map;

weight setting means for setting a weight for each magnitude of the fluctuation quantity of the second map;

damage quantity calculation means for determining the weighted frequency for each magnitude of the fluctuation quantity of the second map by weighting the frequency measured by the frequency measurement means in accordance with the weight set by the weight setting means, and calculating an actual damage quantity exerted on the engine until the predetermined time elapses based on the weighted frequency for each magnitude of the fluctuation quantity of the second map;

corresponding relationship setting means for presetting a correspondence relationship between the magnitude of the damage quantity and a length of life by pre-operating the engine; and life estimation means for determining the life corresponding to the actual damage quantity calculated by the damage quantity calculation means from the correspondence relationship preset by the correspondence relationship setting means, and outputting the determined life as the estimated life of the engine.

7. The life estimation device for an engine according to claim 5, characterized in that the selected operation parameters are the engine rotational speed or a torque or a horse power of the engine.

8. The life estimation device for an engine according to claim 6, characterized in that the first map set by the first map setting means is a two-dimensional map of the engine rotational speed and a torque or a horse power of the engine, and the second map set by the second map setting means is a one-dimensional map of the fluctuation quantity of the engine rotational speed or a one-dimensional map of the fluctuation quantity of the engine torque or the engine horse power.

9. The life estimation device for an engine according to claim 5, characterized in that the device estimates a life of parts constituting the engine, and that a specified detection range to be excluded from a detection target of the detection means, or a specified level to be excluded from a judgment target of the judgment means is preset in accordance with a type of parts constituting the engine.

10. The life estimation device for an engine according to claim 5, characterized in that the device estimates a life of parts constituting the engine, and that the weight to be set by the weight setting means is changed in accordance with a type of parts constituting the engine.

11. The life estimation device for an engine according to claim 5, characterized in that the frequency measured by the frequency measurement means is reset each time the predetermined time elapses, so that the life of the engine is re-estimated each time the predetermined time elapses.

12. A life estimation device for an engine which collects data of operation parameters which values change when the engine is operating and estimates a life of the engine based on the data of the operation parameters, comprising:

a first map setting means for selecting two or more operation parameters indicative of a load exerted on the engine and an engine rotational speed, and setting a first map of two- or more dimensions indicative of a distribution of magnitude of the load exerted on the engine and a magnitude of the rotational speed by dividing combinations of values of the two or more operation parameters into a plurality of levels;

operation parameter detection means for detecting the operation parameter values at each predetermined interval;

judgment means where which level of the first map the operation parameter values, which are detected by the operation parameter detection means at each predetermined interval, belong to, is judged at the predetermined interval;

fluctuation locus calculation means, based on the level judged sequentially by the judgment means, for calculating a fluctuation locus between both levels which fluctuated per unit time;

second map setting means for setting a second map indicative of the distribution of types of the fluctuation locus between both levels per the unit time;

frequency measurement means for measuring a frequency of calculating the respective type of the fluctuation locus until a predetermined time elapses for each type of fluctuation locus of the second map;

weight setting means for setting a weight for each type of fluctuation locus of the second map;

damage quantity calculation means for determining the weighted frequency for each type of fluctuation locus of the second map by weighting the frequency measured by the frequency measurement means in accordance with the weight set by the weight setting means, and calculating an actual damage quantity exerted on the engine until the predetermined time elapses based on the weighted frequency for each type of fluctuation locus of the second map;

correspondence relationship setting means for presetting a correspondence relationship between the magnitude of the damage quantity and a length of the life by pre-operating the engine; and life estimation means for determining the life corresponding to the actual damage quantity calculated by the damage quantity calculation means from the correspondence relationship preset by the correspondence relationship means, and outputting the determined life as the estimated life of the engine.

13. The life estimation device for an engine according to claim 12, characterized in that the first map set by the first map setting means is a two-dimensional map of the engine rotational speed, and a torque or a horse power of the engine.

14. The life estimation device for an engine according to claim 12, characterized in that the device estimates a life of parts constituting the engine, and that a specified detection range to be excluded from a detection target of the detection means, or a specified level to be excluded from a judgment target of the judgment means is preset in accordance with a type of parts constituting the engine.

15. The life estimation device for an engine according to claim 12, characterized in that the device estimates a life of parts constituting the engine, and that the weight to be set by the weight setting means is changed in accordance with a type of parts constituting the engine.

16. The life estimation device for an engine according to claim 12, characterized in that the frequency measured by the frequency measurement means is reset each time the predetermined time elapses so that the life of the engine is re-estimated each time the predetermined time elapses.

17. A life estimation device for a machine having a heat source which collects data of operation parameters which values change when the machine is operating, and estimates a life of the machine based on the data of the operation parameters, comprising:
thermal map setting means for selecting one operation parameter or two or more operation parameters indicative of a heat generated in the heat source, and dividing a value of the one operation parameter or combinations of values of two or more operation parameters into a plurality of levels, so as to set a one-dimensional or two- or more dimensional thermal map for indicating a distribution of magnitude of the heat generated in the engine;
operation parameter detection means for detecting the values of the operation parameters;
time integration means, by detecting the operation parameters by the operation parameter detection means until a predetermined time elapses, for integrating a time during which values of the operation parameters belonging to the respective level are detected for each level of the thermal map;
weight setting means for setting a weight in accordance with the magnitude of heat of the respective level for each level of the thermal map;
damage quantity calculation means for determining a weighted integration time for each level of the thermal map by weighting the integration time integrated by the time integration means in accordance with the weight set by the weight setting means, and calculating an actual damage quantity exerted on a composing element, where the heat generated by the heat source is applied, out of the machine until the predetermined time elapses based on the integration time weighted for each level of the thermal map;
correspondence relationship setting means for presetting the magnitude of the damage quantity and a length of the life by pre-operating the machine; and
life estimation means for determining the life corresponding to the actual damage quantity calculated by the damage quantity calculation means from the correspondence relationship preset by the correspondence relationship setting means, and outputting the determined life as the estimated life of the machine.

18. The life estimation device for a machine according to claim 17, characterized in that the operation parameter indicative of the heat generated in the heat source is a temperature, and the thermal map is a one-dimensional map indicative of a magnitude of the temperature.

19. The life estimation device for a machine according to claim 17, characterized in that the heat source is an engine, and the operation parameter indicative of the heat generated in the heat source is a temperature of the engine.

20. The life estimation device for a machine according to claim 19, characterized in that the rotational speed of the engine and the torque of the engine are detected as the operation parameters, and the temperature of the engine is determined from values of the engine rotational speed and the engine torque.

21. The life estimation device for a machine according to claim 17, characterized in that the heat source is an engine, and the composing element where the heat generated by the heat source is applied is a part constituting the engine or a part constituting a power train to which power by the engine is transferred.

22. The life estimation device for a machine according to claim 17, characterized in that the operation parameter detection means detects the operation parameter values at each predetermined interval, and the time integration means counts the number of times when the operation parameter values belonging to the respective level are detected until the predetermined time elapses for each level of the thermal map so as to integrate the time when the operation parameter values belonging to the respective level are detected for each level of the thermal map.

23. The life estimation device for a machine according to claim 17, characterized in that the integration time integrated by the time integration means is reset each time the predetermined time elapses so as to re-estimate the life of the machine each time the predetermined time elapses.

24. A life estimation device for a machine having a heat source which collects data of operation parameters which values change when the machine is operating, and estimates a life of the machine based on the data of the operation parameters, comprising:
operation parameter detection means for selecting one operation parameter or two or more operation parameters indicative of a heat generated in the heat source, and detecting values of the selected operation parameters at each predetermined interval;
fluctuation quantity calculation means for calculating a fluctuation quantity of the operation parameters per unit time based on the values of the operation parameters detected by the operation parameter detection means at each predetermined interval;
fluctuation quantity map setting means for setting a fluctuation quantity map indicative of a distribution of magnitude of the fluctuation quantity of the operation parameters per the unit time;
frequency measurement means for measuring the frequency of calculating the respective magnitude of the fluctuation quantity until a predetermined time elapses for each magnitude of the fluctuation quantity of the fluctuation quantity map;
weight setting means for setting a weight for each magnitude of the fluctuation quantity of the fluctuation quantity map;
damage quantity calculation means for determining the weighted frequency for each magnitude of the fluctuation quantity of the fluctuation quantity map by weighting the frequency measured by the frequency measurement means in accordance with the weight set by the weight setting means, and calculating an actual damage quantity of a composing element, where the heat generated by the heat source is applied, out of the machine until the predetermined time elapses based on the weighted frequency for each magnitude of the fluctuation quantity of the fluctuation quantity map;
correspondence relationship setting means for presetting a correspondence relationship between the magnitude of the damage quantity and a length of life by pre-operating the machine; and life estimation means for determining a life corresponding to the actual damage quantity calculated by the damage quantity calculation means from the correspondence relationship preset by the correspondence relationship setting means, and outputting the determined life as the estimated life of the machine.

25. A life estimation device for a machine having a heat source which collects data of operation parameters which values change when the machine is operating, and estimates a life of the machine based on the data of the operation parameters, comprising:

a thermal map setting means for selecting one operation parameter or two or more operation parameters indicative of a heat generated in the heat source, and setting a one-dimensional or two- or more dimensional thermal map indicative of a distribution of magnitude of the heat generated in the heat source by dividing a value of one operation parameter or combinations of values of two or more operation parameters into a plurality of levels;

operation parameter detection means for detecting the operation parameter values at each predetermined interval;

judgment means where which level of the thermal map the operation parameter values, which are detected by the operation parameter detection means at each predetermined interval, belongs to, is judged at the predetermined interval;

fluctuation quantity calculation means where based on the levels judged sequentially by the judgment means, a fluctuation width between the levels which fluctuated per unit time is calculated as a fluctuation quantity of the operation parameter per unit time;

thermal fluctuation map setting means for setting a thermal fluctuation map indicative of a distribution of magnitude of the fluctuation quantity of the operation parameters per the unit time;

frequency measurement means for measuring the frequency of calculating the respective magnitude of the fluctuation quantity until a predetermined time elapses for each magnitude of the fluctuation quantity of the thermal fluctuation map;

weight setting means for setting a weight for each magnitude of the fluctuation quantity of the thermal fluctuation map;

damage quantity calculation means for determining the weighted frequency for each magnitude of the fluctuation quantity of the thermal fluctuation map by weighting the frequency measured by the frequency measurement means in accordance with the weight set by the weight setting means, and calculating an actual damage quantity of a composing element, where the heat generated by the heat source is applied, out of the machine until the predetermined time elapses based on the weighted frequency for each magnitude of the fluctuation quantity of the thermal fluctuation map;

correspondence relationship setting means for presetting a correspondence relationship between the magnitude of the damage quantity and a length of life by pre-operating the machine; and life estimation means for determining the life corresponding to the actual damage quantity calculated by the damage quantity calculation means from the correspondence relationship preset by the correspondence relationship setting means, and outputting this determined life as the estimated life of the machine.

26. The life estimation device for a machine according to claim 24, characterized in that the operation parameter indicative of the heat generated in the heat source is a temperature, and the fluctuation quantity map is a map indicative of a distribution of magnitude of the fluctuation quantity of the temperature.

27. The life estimation device for a machine according to claim 24, characterized in that the heat source is an engine, and the operation parameter indicative of the heat generated in the heat source is a temperature of the engine.

28. The life estimation device for a machine according to claim 27, characterized in that an engine rotational speed and an engine torque are detected as the operation parameters, and the temperature of the engine is determined by values of the engine rotational speed and the engine torque.

29. The life estimation device for a machine according to claim 24, characterized in that the heat source is an engine, and the composing element where the heat generated by the heat source is applied is a part constituting the engine or a part constituting a power train to which power by the engine is transferred.

30. The life estimation device for an engine according to claim 25, characterized in that the operation parameter indicative of the heat generated in the heat source is a temperature, the thermal map set by the thermal map setting means is a one-dimensional map of the temperature, and the thermal fluctuation map set by the thermal fluctuation map setting means is a one-dimensional map of a fluctuation quantity of the temperature.

31. The life estimation device for a machine according to claim 25, characterized in that the heat source is an engine and the operation parameter indicative of the heat generated in the heat source is a temperature of the engine.

32. The life estimation device for a machine according to claim 31, characterized in that an engine rotational speed and an engine torque are detected as the operation parameters, and the temperature of the engine is determined by values of the engine rotational speed and the engine torque.

33. The life estimation device for a machine according to claim 25, characterized in that the heat source is an engine, and the composing element where the heat generated by the heat source is applied is a part constituting the engine or a part constituting a power train to which power by the engine is transferred.

34. The life estimation device for a machine according to claim 24, characterized in that the device estimates the life of parts constituting the machine, and that the weight set by the weight setting means is changed in accordance with a type of the part constituting the machine.

35. The life estimation device for an engine according to claim 24, characterized in that the frequency measured by the frequency measurement means is reset each time the predetermined time elapses so as to re-estimate the life of the engine each time the predetermined time elapses.

* * * * *